US011609177B2

(12) United States Patent
Norton

(10) Patent No.: US 11,609,177 B2
(45) Date of Patent: Mar. 21, 2023

(54) ENCLOSED DROPLET SORTER AND METHODS OF USING THE SAME

(71) Applicant: Becton, Dickinson and Company, Franklin Lakes, NJ (US)

(72) Inventor: Pierce O. Norton, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 1079 days.

(21) Appl. No.: 15/472,020

(22) Filed: Mar. 28, 2017

(65) Prior Publication Data

US 2017/0299493 A1    Oct. 19, 2017

Related U.S. Application Data

(60) Provisional application No. 62/364,282, filed on Jul. 19, 2016, provisional application No. 62/323,418, filed on Apr. 15, 2016.

(51) Int. Cl.
*G01N 15/14* (2006.01)
*G01N 21/64* (2006.01)
(Continued)

(52) U.S. Cl.
CPC .......... *G01N 15/1436* (2013.01); *B01L 3/502* (2013.01); *G01N 15/1459* (2013.01);
(Continued)

(58) Field of Classification Search
CPC combination set(s) only.
See application file for complete search history.

(56) References Cited

U.S. PATENT DOCUMENTS

| D339,194 S | 9/1993 | Telang |
| D676,567 S | 2/2013 | Van Den Engh |

(Continued)

FOREIGN PATENT DOCUMENTS

| EP | 0672458 A2 | 9/1995 |
| JP | 4-500008 A | 1/1992 |

(Continued)

OTHER PUBLICATIONS

Jayasinghe et al. "Sterile and Disposable Fluidic Subsystem Suitable for Clinical High Speed Fluorescence-Activated Cell Sorting", Cytometry Part B (Clinical Cytometry) 708:344-354 (2006).

(Continued)

*Primary Examiner* — Brian R Gordon
(74) *Attorney, Agent, or Firm* — Bret E. Field; Bozicevic, Field & Francis LLP

(57) ABSTRACT

Aspects of the present disclosure include a particle sorting module for sorting components of a sample, such as cells in a biological sample. Particle sorting modules according to certain embodiments include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. A particle sorting system and methods for separating components of a sample as well as kits, including one or more particle sorting module, suitable for coupling with a particle sorting system and for practicing the subject methods are also provided.

18 Claims, 16 Drawing Sheets

(51) Int. Cl.
*G01N 21/05* (2006.01)
*B01L 3/00* (2006.01)
*G01N 15/10* (2006.01)

(52) U.S. Cl.
CPC ............ *B01L 2200/0652* (2013.01); *G01N 2015/1006* (2013.01); *G01N 2015/149* (2013.01); *G01N 2015/1452* (2013.01)

(56) References Cited

U.S. PATENT DOCUMENTS

| | | | |
|---|---|---|---|
| 8,455,258 | B2 | 6/2013 | Quake et al. |
| 8,727,132 | B2 | 5/2014 | Miltenyi et al. |
| 8,795,500 | B2 | 8/2014 | Shinoda |
| D715,925 | S | 10/2014 | Suzuki |
| D717,438 | S | 11/2014 | Lin |
| D802,150 | S | 11/2017 | Lund |
| 2004/0025602 | A1 | 2/2004 | Norton |
| 2004/0062685 | A1 | 4/2004 | Norton |
| 2004/0142463 | A1 | 7/2004 | Walker et al. |
| 2005/0011582 | A1 | 1/2005 | Haug |
| 2006/0118167 | A1* | 6/2006 | Neas ............ B01L 3/0296 137/67 |
| 2009/0107893 | A1* | 4/2009 | Schembri ........ G01N 15/1459 209/127.1 |
| 2011/0020855 | A1 | 1/2011 | Shinoda et al. |
| 2011/0137018 | A1 | 6/2011 | Chabg-Yen et al. |
| 2011/0217723 | A1 | 9/2011 | Durack |
| 2011/0259749 | A1* | 10/2011 | Kanda ............... G01N 15/14 204/600 |
| 2011/0271746 | A1 | 11/2011 | Shinoda |
| 2011/0284378 | A1 | 11/2011 | Shinoda |
| 2012/0164718 | A1 | 6/2012 | Bishop et al. |
| 2012/0276621 | A1 | 11/2012 | Van Den Engh |
| 2013/0330739 | A1 | 12/2013 | Yu |
| 2014/0078502 | A1 | 3/2014 | Buchanan et al. |
| 2014/0120570 | A1 | 5/2014 | Yu et al. |
| 2014/0170697 | A1 | 6/2014 | Sharpe et al. |
| 2014/0174206 | A1* | 6/2014 | Akiyama ........... G01N 15/1484 73/863 |
| 2015/0330385 | A1 | 11/2015 | Lofstrom et al. |
| 2016/0041082 | A1 | 2/2016 | Van Den Engh |
| 2017/0299493 | A1 | 10/2017 | Norton |

FOREIGN PATENT DOCUMENTS

| | | |
|---|---|---|
| JP | 2000-516345 A | 12/2000 |
| JP | 2012251881 A | 12/2012 |
| WO | WO 90/04019 A1 | 4/1990 |
| WO | WO 99/26067 A1 | 5/1999 |
| WO | WO 2010/033140 A2 | 3/2010 |

OTHER PUBLICATIONS

Miltenyi Biotec Gmbh, CliniMACS® Cell Separation Systems, Product Catalog 2008, 48 pages.

Miltenyi Biotec Gmbh, CliniMACS® User Manual, US Edition, Software 2.40, Jan. 2014, 128 pages.

Miltenyi Biotec Gmbh, CliniMACS® User Manual for the CliniMACS® CD34 Reagent System, Jan. 2014, 102 pages.

Sandin et al. "Magnetophoresis and cytometry with magnetic microparticles", International Congress Series, Jun. 2007, vol. 1300, pp. 271-274.

Yang et al. "Micro flow cytometry utilizing a magnetic bead-based immunoassay for rapid virus detection", Biosensors and Bioelectronics, Dec. 1, 2008, vol. 24, No. 4, pp. 855-862.

"BD Biosciences, Ltd., FACSAria II Operator's Guide", 11 Pages, on Doc 88.com Online Document Sharing Platform, 2007.

\* cited by examiner

ENCLOSED DROPLET SORTER AND METHODS OF USING THE SAME

CROSS-REFERENCE TO RELATED APPLICATIONS

Pursuant to 35 U.S.C. § 119(e), this application claims priority to the filing date of U.S. Provisional Patent Application Ser. No. 62/323,418, filed Apr. 15, 2016, and U.S. Provisional Patent Application Ser. No. 62/364,282, filed Jul. 19, 2016; the disclosures of which applications are incorporated herein by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

One type of flow-type particle sorting system is the electrostatic sorting type. In an electrostatic sorter, a fluid suspension is jetted from a nozzle and vibrated to break the stream into uniform discrete drops. The sorting mechanism includes a drop charging means connected to the stream to charge drops containing a particle of the type to be sorted with an electrical charge as it breaks off from the jet stream. The stream of drops is passed through a transverse electrostatic field established by a pair of oppositely charged deflection plates. Charged drops containing a particle of the type to be sorted are deflected in a direction and in an amount related to the polarity and magnitude of the drop charge and are collected in distinct collection receptacles. Uncharged drops are not deflected passing through the electrostatic field and are collected by a central receptacle.

SUMMARY

Aspects of the present disclosure include a particle sorting module for sorting particle components of a sample, such as cells in a biological sample. Particle sorting modules according to certain embodiments include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. A particle sorting system and methods for separating components of a sample as well as kits, including one or more particle sorting module, suitable for coupling with a particle sorting system and for practicing the subject methods are also provided.

In embodiments, the enclosed housing is configured for coupling with a particle sorting system with one or more aligners. In some embodiments, the aligner includes one or more protrusions, such as balled tipped pin protrusions to align and couple the particle sorting module to the particle sorting system. The particle sorting module may also include a sample inlet and a sheath fluid inlet at the proximal end of the housing. The particle sorting module may be configured with electrical connectors on the housing. In some embodiments, the particle sorting module also includes two or more sample collection containers. The sample collection containers may be fastened to the housing, such as being screw threaded with the housing. The particle sorting module may also include a cuvette, such as a glass or plastic cuvette positioned in the sample interrogation region. In some embodiments, the cuvette is positioned in the sample interrogation region with an adhesive. In other embodiments, the cuvette is co-molded with the housing.

Aspects of the present disclosure also include systems for sorting particle components of a sample, such as cells in a biological sample. Systems according to certain embodiments include one or more particle sorting modules, a sample input module fluidically coupled to an inlet at the proximal end of the particle sorting module and a waste tank fluidically coupled to an outlet from the particle sorting module. In embodiments, the system is configured to be coupled with one or more particle sorting module. In some embodiments, the system includes a register for coupling with the aligners on the housing of the particle sorting module. For example, the register may include a registration flat, a registration cone, a registration vee or a combination thereof.

When coupled to the particle sorting system, the inlet of the particle sorting module may be fluidically coupled to a sample input module, such as through a conduit. The conduit may be coupled to the inlet of the particle sorting module with a sterile connector, such as a Luer-Lok connecter, a screw fit connector or a connecter that joins two conduits through a breakable seal, a sterile tube weld, etc. The sample input module may be coupled to a gas input to control fluid flow into and through the particle sorting module. In certain embodiments, the gas input includes a filter and a pinch valve. The sample input module, in some instances, also includes an agitator such as a ball agitator and a temperature controller.

In some embodiments, the sample input module includes a sheath fluid delivery subsystem configured to convey sheath fluid into the particle sorting module through a sheath fluid inlet. In some instances, the sheath fluid delivery subsystem includes a sterile pliant container in a pressurized tank. In other instances, the sheath fluid delivery subsystem includes two pliant containers in a housing, where the first pliant container includes a sheath fluid reservoir and a conduit having a proximal end fluidically coupled to the sheath fluid reservoir and a distal end configured for coupling to the sheath fluid inlet of the particle sorting module and a second pliant container that is configured to apply pressure to the sheath fluid reservoir of the first pliant container to convey sheath fluid into the particle sorting module.

In embodiments, the waste tank is in fluid communication with the distal end of the particle sorting module. In some embodiments, the waste tank includes one or more ports, such as a port for venting accumulated gas pressure in the particle sorting module, a port for collecting waste from the particle sorting module and a port for venting accumulated gas pressure in the waste tank or any combination thereof. The waste stream from the particle sorting module may be conveyed to the waste tank through a conduit. The conduit may be coupled to the waste tank with a connector, such as a Luek-Lok connector or a screw fit connector.

Aspects of the disclosure also include methods for sorting particles of a sample, such as cells in a biological sample. Methods according to certain embodiments include irradiating a sample containing particles in a flow stream in an interrogation region of a particle sorting module, detecting light (e.g., fluorescent light) from the sample and sorting the particles of the sample into two or more sample collection containers. In certain embodiments, the sample is a biological sample and methods include sorting and collecting two or more different types of cells.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
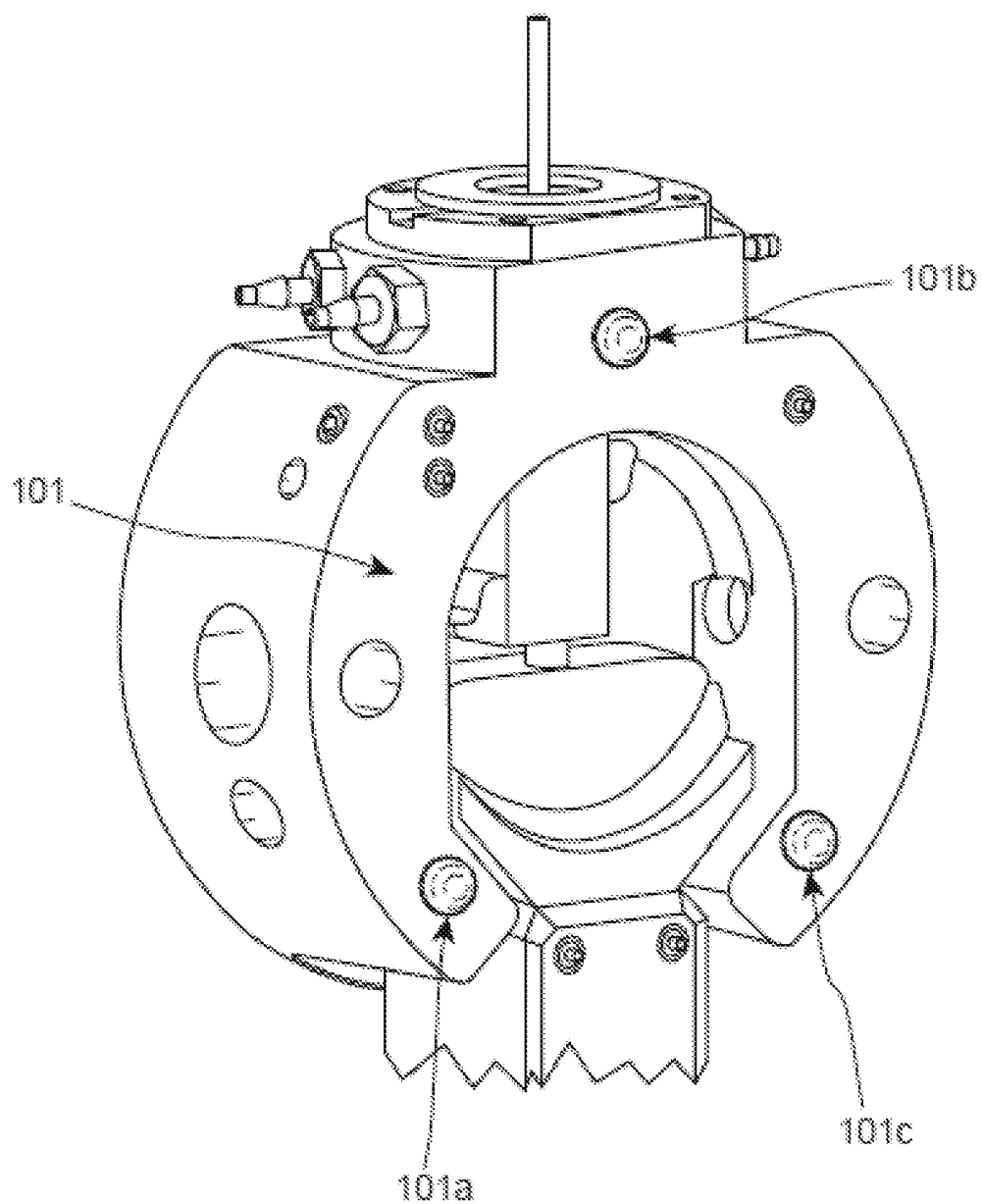
FIG. 1 depicts an outer wall of a particle sorting module housing according to certain embodiments.

Aspects of the present disclosure include a particle sorting module for sorting particle components of a sample, such as cells in a biological sample. Particle sorting modules according to certain embodiments include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. A particle sorting system and methods for separating components of a sample as well as kits, including one or more particle sorting module, suitable for coupling with a particle sorting system and for practicing the subject methods are also provided.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As summarized above, the present disclosure provides a particle sorting module for sorting particle components of a sample, such as cells in a biological sample. In further describing embodiments of the disclosure, particle sorting modules having an enclosed housing that include an aligner for coupling the housing with a particle sorting system are first described in greater detail. Next, particle sorting systems and methods for separating particles in a sample are described. Kits, including one or more particle sorting module, suitable for coupling with a particle sorting system and for practicing the subject methods are also provided.

Particle Sorting Modules

Aspects of the present disclosure include a particle sorting module for sorting components of a sample, such as cells in a biological sample. The term "sorting" is used herein in its conventional sense to refer to separating components (e.g., cells, non-cellular particles such as biological macromolecules) of the sample and in some instances, as described below, delivering the separated components to a receiving location having one or more containers. For example, the subject particle sorting modules may be configured for sorting samples having 2 or more components, such as 3 or more components, such as 4 or more components, such as 5 or more components, such as 10 or more component, such as 15 or more components and including soring a sample having 25 or more components. One or more of the sample components may be separated from the sample and delivered to a container, such as 2 or more sample components, such as 3 or more sample components, such as 4 or more sample components, such as 5 or more sample components, such as 10 or more sample components and including 15 or more sample components may be separated from the sample and delivered to a container at the receiving location.

In embodiments, particle sorting modules include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. The term "enclosed" is meant that each component of the particle sorting module is fully contained within the housing and the components are sealed off or isolated from the ambient environment. In other words, the components within the enclosed housing are not exposed to or have no contact with the outside environment. In some embodiments, the components contained within the housing are isolated from the gaseous environment of the ambient environment (i.e., are not exposed to the gases outside of the housing). In other embodiments, the components contained within the housing are isolated from the fluidic environment of the ambient environment (i.e., are not exposed to any fluids present outside of the housing). In yet other embodiments, the components contained within the housing are sterile and are isolated from live bacteria or other microorganisms that are present in the ambient environment (i.e., sterile).

Particle sorting modules of interest are configured to be coupled to a particle sorting system where a stream of droplets is produced in the particle sorting module and passed substantially one at a time through a sample interrogation region where the particles are detected and identified. Droplet deflectors are positioned downstream from the sample interrogation region and are configured to deflect the analyzed droplets into one or more containers. Particle sorting modules include an enclosed housing having an aligner for coupling the housing with a particle sorting system, a flow cell nozzle positioned at the proximal end of the housing, a sample interrogation region in fluid communication with the orifice of the flow cell nozzle and a droplet deflector. The housing has a distal end and a proximal end with walls therebetween that together form an inner chamber. In embodiments, one or more of the outer walls of the housing have aligners for coupling the housing to a particle sorting system. For example, the housing may have 2 or more walls having aligners for coupling the housing to a particle sorting system, such as 3 or more walls and including 4 or more walls having aligners. In certain embodiments, the housing has one wall having aligners for coupling the housing to a particle sorting system. Each wall having an aligner may include 1 or more aligner, such as 2 or more aligners, such as 3 or more aligners, such as 4 or more aligners, such as 5 or more aligners, such as 7 or more aligners and including 10 or more aligners. In certain embodiments, the particle sorting device includes an outer wall with 3 aligners.

Any suitable type of aligner may be employed, such as an alignment protrusion, an alignment rail, an alignment notch, an alignment groove, an alignment slot, an alignment countersink, an alignment counter-bore, an alignment recess, an alignment hole or a combination thereof. For example, in some instances an outer wall of the housing includes one or more protrusions, such as a pin, a dowel or a bump. In certain embodiments, the aligner is a pin, such as a ball tipped pin. In other instances, an outer wall of the housing includes one or more recesses, such as a hole or a notch. In certain instances, an outer wall of the housing includes one or more alignment protrusions and one or more alignment recesses.

The shape of the aligners may vary, where cross-sectional shapes of interest include, but are not limited to rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the aligners are cylindrically shaped. In other embodiments, the aligners are spherical. In yet other embodiments, the aligners are polygonal-shaped, such as square-shaped or rectangular. In certain embodiments, the aligner is a cylindrical pin having a spherical tip (e.g., ball tipped pin). Each aligner may have be same or different shape depending on the coupling register of the particle sorting system (as described in greater detail below). In some embodiments, each aligner has the same shape. In other embodiments, each aligner has a different shape. In yet other embodiments, two or more aligners have the same shape and one or more aligners have a different shape.

The size of each aligner may vary, where the width of each ranges in some instances from microns to mms, such as 1 micron to 50 mm, e.g., 10 microns to 40 mm, including 100 microns to 30 mm, e.g., 500 microns to 25 mm, and in some instances from 1 mm to 25 mm, such as from 2 mm to 22 mm, such as from 3 mm to 20 mm, such as from 4 mm to 17 mm and including from 5 mm to 15 mm. The length of each aligner ranges in some instances from microns to mms, such as 1 micron to 100 mm, e.g., 10 microns to 90 mm, including 100 microns to 75 mm, e.g., 500 microns to 60 mm, and in some instances from 1 mm to 50 mm, such as from 2 mm to 45 mm, such as from 3 mm to 40 mm, such as from 4 mm to 35 mm, such as from 5 mm to 30 mm and including from 10 mm to 20 mm. Each aligner may have the same or different dimensions depending on the size of each registration coupling on the register of the particle sorting system. In some embodiments, each aligner is the same size. In other embodiments, each aligner is a different size. In yet other embodiments, two or more aligners are the same size and one or more aligners have a different size.

Where the aligner is a protrusion, in certain embodiments, the length of the protrusion is adjustable. In these embodiments, the distance that the protrusion extends from the surface of the outer wall may be increased or decreased as desired. For example, the protrusion may be adjusted to extend from the surface of the outer wall in some instances from microns to mms, such as 1 micron to 50 mm, e.g., 10 microns to 40 mm, including 100 microns to 30 mm, e.g., 500 microns to 25 mm, and in some instances from from 1 mm to 25 mm, such as from 2 mm to 22 mm, such as from 3 mm to 20 mm, such as from 4 mm to 17 mm and including from 5 mm to 15 mm. The length of each protrusion may be adjusted by any convenient protocol, such as a spring, screw thread or with a series of notches at discrete predetermined increments (e.g., 1 micron increments, 10 micron increments, 100 micron increments, 500 micron increments 1 mm increments, 2 mm increments, etc.)

In some embodiments, aligners of interest include ball tipped pin protrusions. In these embodiments, the ball tipped pin protrusions have a width which ranges from microns to mms, such as 1 micron to 50 mm, e.g., 10 microns to 40 mm, including 100 microns to 30 mm, e.g., 500 microns to 25 mm, and in some instances from 1 mm to 25 mm, such as from 2 mm to 22 mm, such as from 3 mm to 20 mm, such as from 4 mm to 17 mm and including from 5 mm to 15 mm and a length which ranges in some instances from microns to mms, such as 1 micron to 100 mm, e.g., 10 microns to 90 mm, including 100 microns to 75 mm, e.g., 500 microns to 60 mm, and in some instances from 1 mm to 50 mm, such as from 2 mm to 45 mm, such as from 3 mm to 40 mm, such as from 4 m to 35 mm, such as from 5 mm to 30 mm and including from 10 mm to 20 mm. In embodiments, the particle sorting module may include 1 or more ball tipped pin protrusions on an outer wall of the housing, such as 2 or more ball tipped pin protrusions, such as 3 or more and including 5 or more ball tipped pin protrusions. Where the particle sorting module includes more than one ball tipped pin protrusion on an outer wall of the housing, each ball tipped pin protrusion may be the same or different size. In some embodiments, each of the ball tipped pin protrusions are identical in size. In other embodiments, each ball tipped pin protrusion has a different size. In certain instances, the length of the pin is longer on some of the ball tipped pin protrusions. In other instances, the size of the ball at the tip of the protrusion is larger on some of the ball tipped pin protrusions. In certain embodiments, particle sorting modules of interest have three identically sized ball tipped pin protrusions on an outer wall of the housing.

The aligners may be positioned at any location on the outer wall of the housing. For example, in some embodiments the aligners are positioned along the periphery of the wall, such as 10 microns or more, e.g., 250 microns or more, including 500 microns or more, e.g., 1 mm or more, such as 2 mm or more, such as 3 mm or more, such as 4 mm or more and including 5 mm from the edge of the wall. For polygonal shaped walls, the aligners may be positioned at the corners of the wall. For example, where the outer wall is square or rectangular, the aligners may be positioned at one or more of the four corners of the square or rectangular wall.

In some embodiments, the outer wall is circular and the aligners are positioned equidistant from the center of the wall. For instance, the aligners may be positioned 1 mm or more from the center of the wall, such as 2 mm or more from the center of the wall, such as 3 mm or more from the center of the wall, such as 5 mm or more from the center of the wall, such as 10 mm or more from the center of the wall and including 25 mm or more from the center of the wall. In other embodiments, the outer wall is circular and the aligners are positioned at different distances from the center of the wall. In these embodiments, each aligner is independently positioned 1 mm or more from the center of the wall, such as 2 mm or more from the center of the wall, such as 3 mm or more from the center of the wall, such as 5 mm or more from the center of the wall, such as 10 mm or more from the center of the wall and including 25 mm or more from the center of the wall.

Where an outer wall includes more than one aligner, the distance between each aligner may vary, being spaced apart in some embodiments by 2 mm or more, such as by 3 mm or more, such as by 5 mm or more, such as by 7 mm or more, such as by 10 mm or more and including by 25 mm or more. Where the mount includes three or more aligners, the distance between each aligner may be the same or different or a combination thereof. In some embodiments, the distance between each aligner is different. In other embodiments, each aligner is spaced equidistant from each other. In certain embodiments, the housing includes 3 aligners that are equidistantly spaced along the periphery of an outer wall. For instance, the housing may include 3 ball tipped pin protrusions that are positioned equidistantly from the center of a circular-shaped outer wall.

FIG. 1 depicts an outer wall of a particle sorting module housing according to certain embodiments. Outer wall 101 includes three ball tipped pin protrusion aligners 101a, 101b and 101c that are positioned equidistantly from each other and equidistantly from the center of circular-shaped outer wall 101. The length of each protrusion is adjustable (e.g., with a spring) where aligner 101a is depicted as longer (i.e., protrudes further from outer wall 101) than aligner 101b which is still longer than aligner 101c.

In some embodiments, the outer wall of the housing includes one or more fasteners for maintaining the particle sorting module in contact with the particle sorting system (as described in greater detail below). Suitable fasteners may include, but are not limited to magnets, hook and loop fasteners, Velcro, non-permanent adhesives or a combination thereof. In certain embodiments, the outer wall of the housing includes one or more magnets for coupling to one or more magnets on the register of the particle sorting system. In these embodiments, alignment between the particle sorting module and the register may be achieved by coupling magnets on the register with the magnets on the outer wall of the particle sorting module housing. In some embodiments, the particle sorting module includes both aligners and magnets. In other embodiments, the aligner includes one or more magnets, such as a protrusion (e.g., ball tipped pin protrusion) that has a magnet at the tip. In certain embodiments, the aligner is a magnet, such as a magnetic protrusion, a magnetic ball at the tip of a pin protrusion or a magnet positioned within a hole or a recess. The term "magnet" is used herein in its conventional sense to refer to a magnetic material that has a persistent magnetic field such that the magnetic field from the magnet does not substantially decrease over time. For example, the magnet may be an iron alloy material having aluminum, nickel and cobalt (i.e., Alnico magnets), a ceramic or ferrite magnet, a rare-earth magnet such as samarium-cobalt magnets (e.g., $SmCo_5$), neodymium alloy (NdFeB) magnets (e.g., $Nd_2Fe_{14}B$) or a combination thereof. Depending on the size of the magnet, the magnet field produced by magnets of interest positioned at the connector proximal end range from 0.01 T to 10 T, or from 0.01 T to 5 T, or from 0.01 T to 2 T, or from 0.1 T to 2 T, or from 0.1 T to 1.5 T, including from 0.1 T to 1 T.

Where the particle sorting module housing and register of the particle sorting system include one or more magnets, the magnets on the particle sorting module housing are placed into physical contact with the magnets positioned on the register to couple the particle sorting module and the particle sorting system together. In certain embodiments, the magnets positioned on the particle sorting module housing and the register of the particle sorting system are disk shaped and alignment of the particle sorting system register and particle sorting module housing is achieved when each magnet of the particle sorting system register is coupled with each magnet on the particle sorting module housing. By placing the magnets of the particle sorting module housing into contact with the magnets of the particle sorting system register, the particle sorting module is aligned and releasably attached to the particle sorting system by the magnetic attraction between each set of magnet contacts.

In some embodiments, the outer wall of the housing includes one or more electrical connections configured for electrical connectivity between the particle sorting module and the particle sorting system. For example, the outer housing may include 2 or more electrical connections, such as 3 or more electrical connections, such as 4 or more electrical connections, such as 5 or more electrical connections and including 10 or more electrical connections. The electrical connection, in some embodiments, provides power to the droplet deflector plates. Any convenient electrical connection may be employed, such as conductive pins, pads, wires or coils which protrude or are recessed within the outer walls of the housing. In certain embodiments, particle sorting modules of interest include 5 or more electrical pins.

Figure 2:
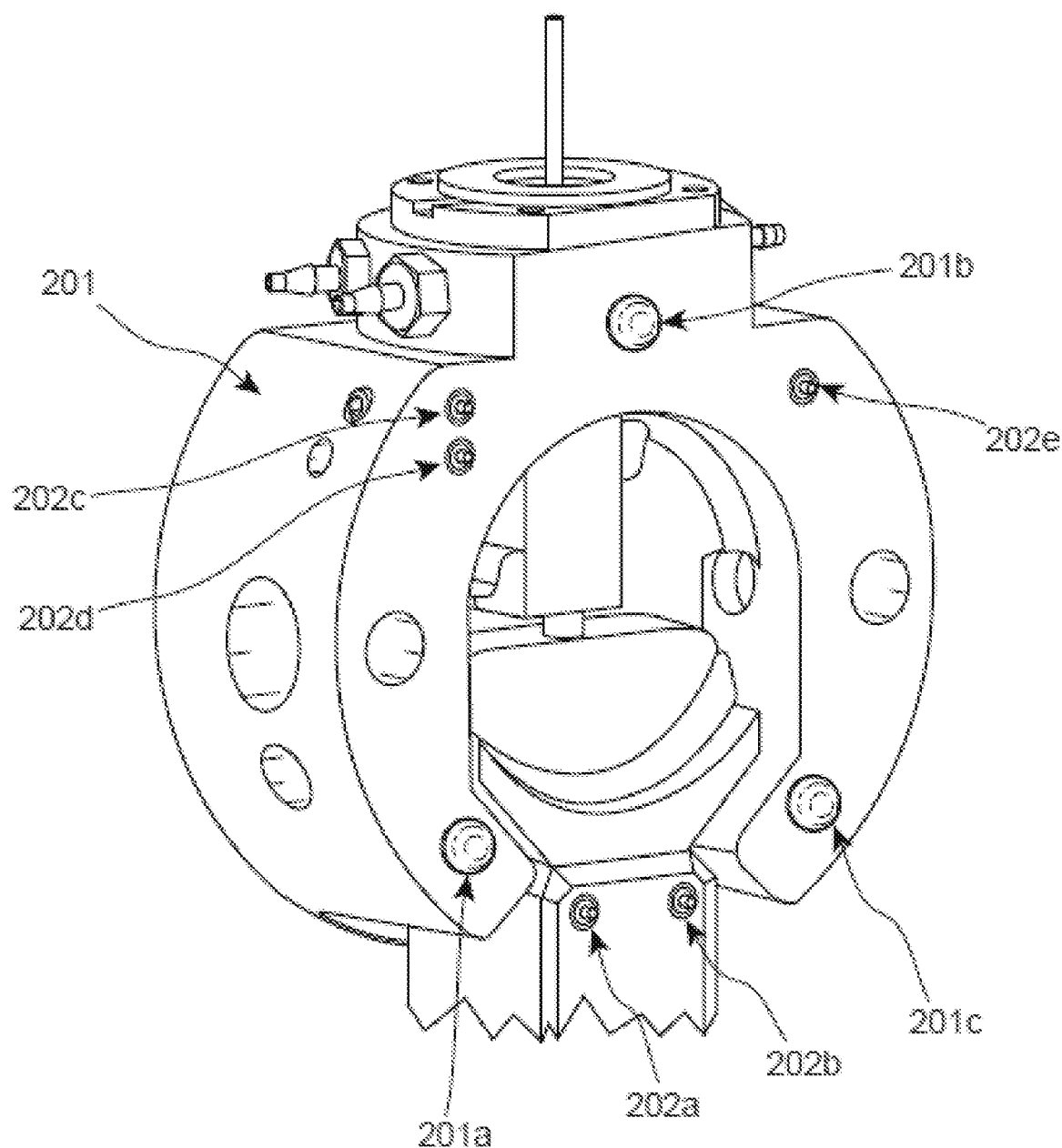
FIG. 2 depicts an outer wall of a particle sorting module housing having electrical connectors according to certain embodiments.

FIG. 2 depicts an outer wall of a particle sorting module housing having electrical connectors according to certain embodiments. Outer wall 201 includes three ball tipped pin protrusion aligners 201a, 201b and 201c that are positioned equidistantly from each other and equidistantly from the center of circular-shaped outer wall 201. Outer wall 201 also includes five electrical connector pins 202a, 202b, 202c, 202d and 202e configured to provide an electrical connection (e.g., power) to the particle sorting module (e.g., droplet deflector plates).

The size of the particle sorting module housing may vary having a length that ranges from 10 cm to 100 cm, such as from 15 cm to 95 cm, such as from 20 cm to 90 cm, such as from 25 cm to 85 cm, such as from 30 cm to 80 cm, such as from 35 cm to 75 cm and including from 40 cm to 60 cm. The width of the particle sorting module housing may range from 1 cm to 25 cm, such as from 2 cm to 20 cm, such as from 3 cm to 15 cm and including from 5 cm to 10 cm. The housing may be formed from any suitable material that is compatible with a fluidic sample (e.g., biological sample), including metal, glass (e.g., Pyrex glass, borosilicate glass), ceramic or plastic. In certain embodiments, the particle sorting module housing is formed from a plastic, such as a rigid plastic, polymeric or thermoplastic material. For example, suitable plastics may include, but are not limited to polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the particle sorting module housing is formed from a polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly (alkylene adipates) such as poly(ethylene adipate), poly(1, 4-butylene adipate), and poly(hexamethylene adipate); poly (alkylene suberates) such as poly(ethylene suberate); poly (alkylene sebacates) such as poly(ethylene sebacate); poly (ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly (trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3', 5,5'-tetramethylbisphenol A; polyamides such as poly(p-phenylene terephthalamide); polyesters, e.g., polyethylene terephthalates, e.g., Mylar™ polyethylene terephthalate; etc.

As summarized above, the subject particle sorting module includes a flow cell nozzle having an orifice positioned at the proximal end of the housing. Any convenient flow cell nozzle which propagates a fluidic sample to a sample interrogation region may be employed, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to:

rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, where in some instances the rate of sample conveyed to the flow cell nozzle chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

Figure 3A:
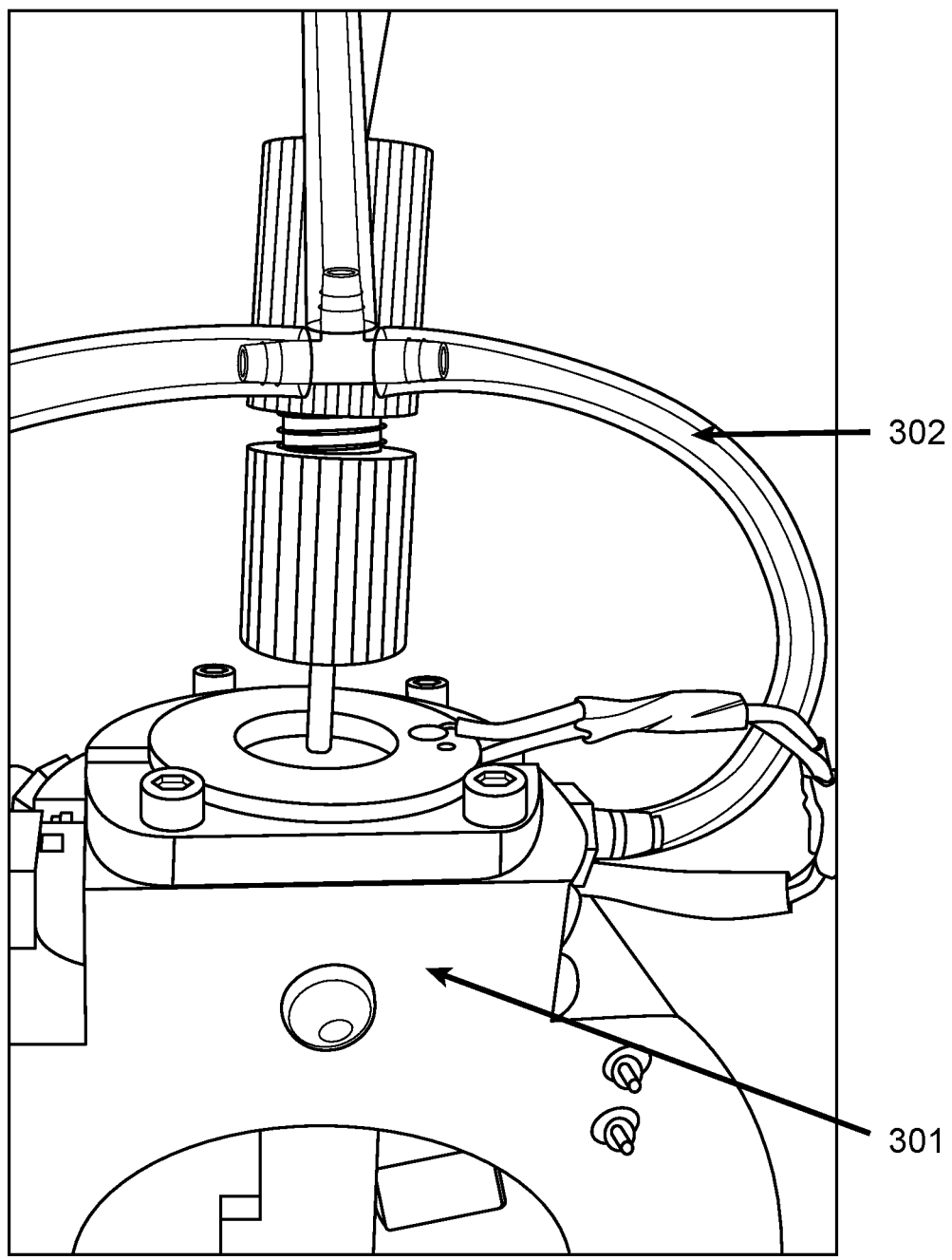
FIG. 3 depicts a side view and top view of a particle sorting module with sample and sheath fluid inlets according to certain embodiments.
Figure 3B:
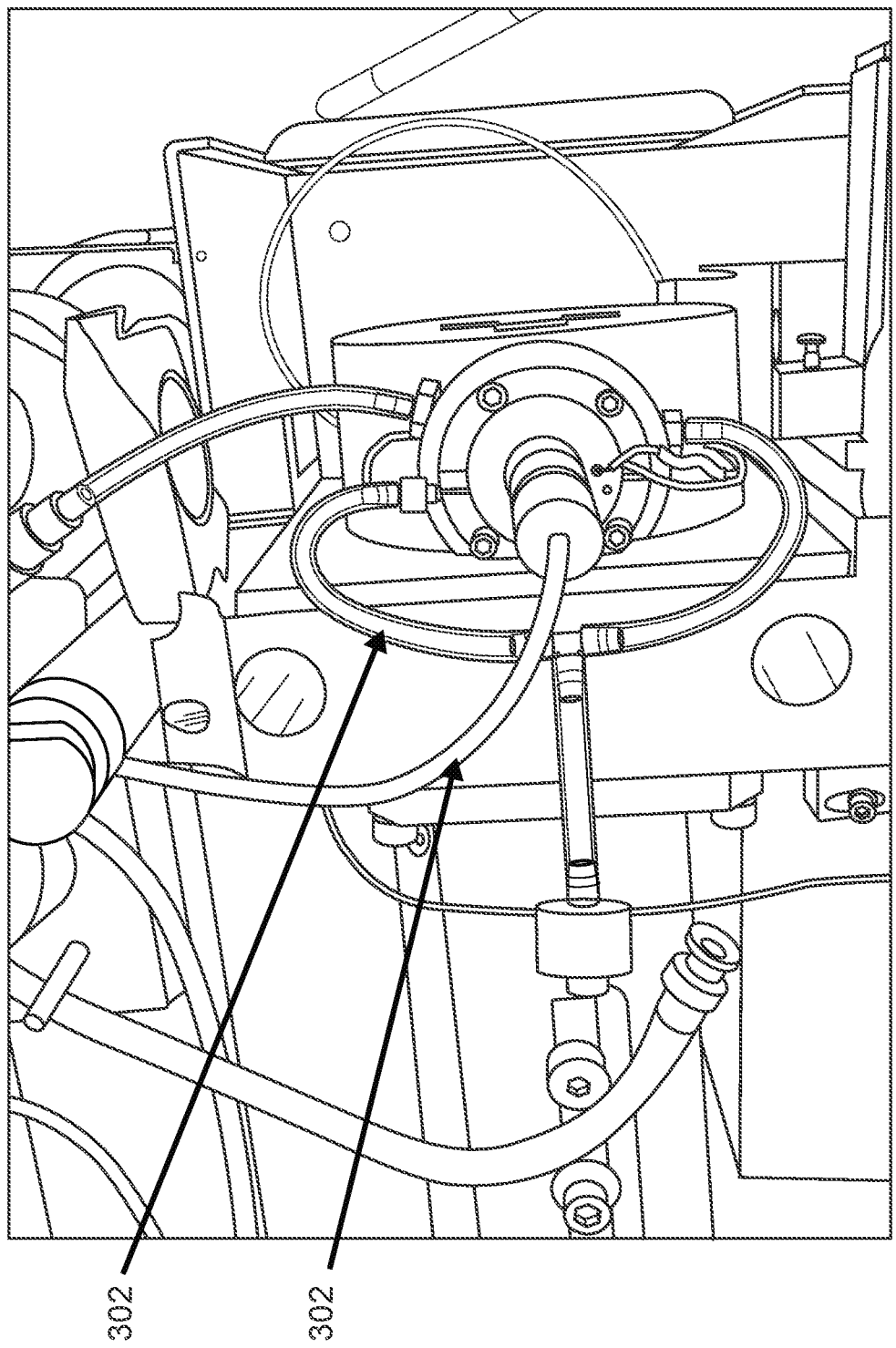

FIG. 3 depicts a side view and top view of a particle sorting module with sample and sheath fluid inlets according to certain embodiments. The proximal end of particle sorting module 301 includes a conduit 302 for conveying sample fluid and a conduit 303 for conveying sheath fluid to a flow nozzle (not shown) inside of particle sorting module 301.

The particle sorting module also includes a sample interrogation region in fluid communication with the flow cell nozzle orifice. As described in greater detail below, a sample flow stream emanates from an orifice at the distal end of the flow cell nozzle and particles in the flow stream may be irradiated with a light source at the sample interrogation region of the particle sorting module. The size of the interrogation region of the particle sorting module may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more of the particle sorting module.

The interrogation region on the particle sorting module may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region on the particle sorting module includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region of the particle sorting module may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the particle sorting module at the interrogation region may be formed from any transparent material which passes the desired range of wavelength, including but not limited to optical glass, borosilicate glass, Pyrex glass, ultraviolet quartz, infrared quartz, sapphire as well as plastic, such as any of the polymeric plastic material used to form the housing as described above.

In some embodiments, particle sorting modules of interest include a cuvette positioned in the sample interrogation region. In some instances, the cuvette is affixed within the particle sorting module at the sample interrogation region, such as with an adhesive or mechanically held in place, e.g., with a clip or screw. In other instances, the cuvette is co-molded with the particle sorting module at the sample interrogation region. In certain instances, the cuvette is incorporated directly into the particle sorting module. The cuvette may be formed from any transparent material which passes the desired range of wavelength, including but not limited to optical glass, borosilicate glass, Pyrex glass, ultraviolet quartz, infrared quartz, sapphire as well as a plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the sample interrogation region includes one or more optical adjustment components. By "optical adjustment" is meant that light irradiated onto the sample interrogation region or light collected from an irradiated flow stream is changed as desired. In some embodiments, the sample interrogation region includes an optical adjustment component for adjusting the light irradiated onto the sample interrogation region by a light source. In other embodiments, the sample interrogation region includes an optical adjustment component for adjusting light emanating from an irradiated flow stream before being conveyed to a detector for measurement. In yet other embodiments, the sample interrogation region includes an optical adjustment component for adjusting both the light irradiated onto the sample interrogation region by a light source and the light emanating from an irradiated flow stream before being conveyed to a detector for measurement. For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the collected the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam.

Optical adjustment components may be any convenient device or structure which provides the desired change in the collected light and may include, but is not limited to, lenses, mirrors, pinholes, slits, gratings, light refractors, and any combinations thereof. The particle sorting module may include one or more optical adjustment components at the sample interrogation region as needed, such as two or more, such as three or more, such as four or more and including five or more optical adjustment components.

Where the particle sorting module includes one or more optical adjustment components at the sample interrogation region, the optical adjustment component may be physically coupled to the particle sorting module, such as with an adhesive, co-molded to the housing or integrated directly into the particle sorting module housing with the optical adjustment component positioned at the sample interrogation region. As such, the optical adjustment component and the particle sorting module may be integrated into a single unit.

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75, such as including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest which may be a part of or combined with the subject flow cell nozzles, include but are not limited to, colored glass, bandpass filters, interference filters, dichroic mirrors, diffraction gratings, monochromators and combinations thereof, among other wavelength separating protocols. In some embodiments, the wavelength separator is an optical filter. For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

Figure 4:
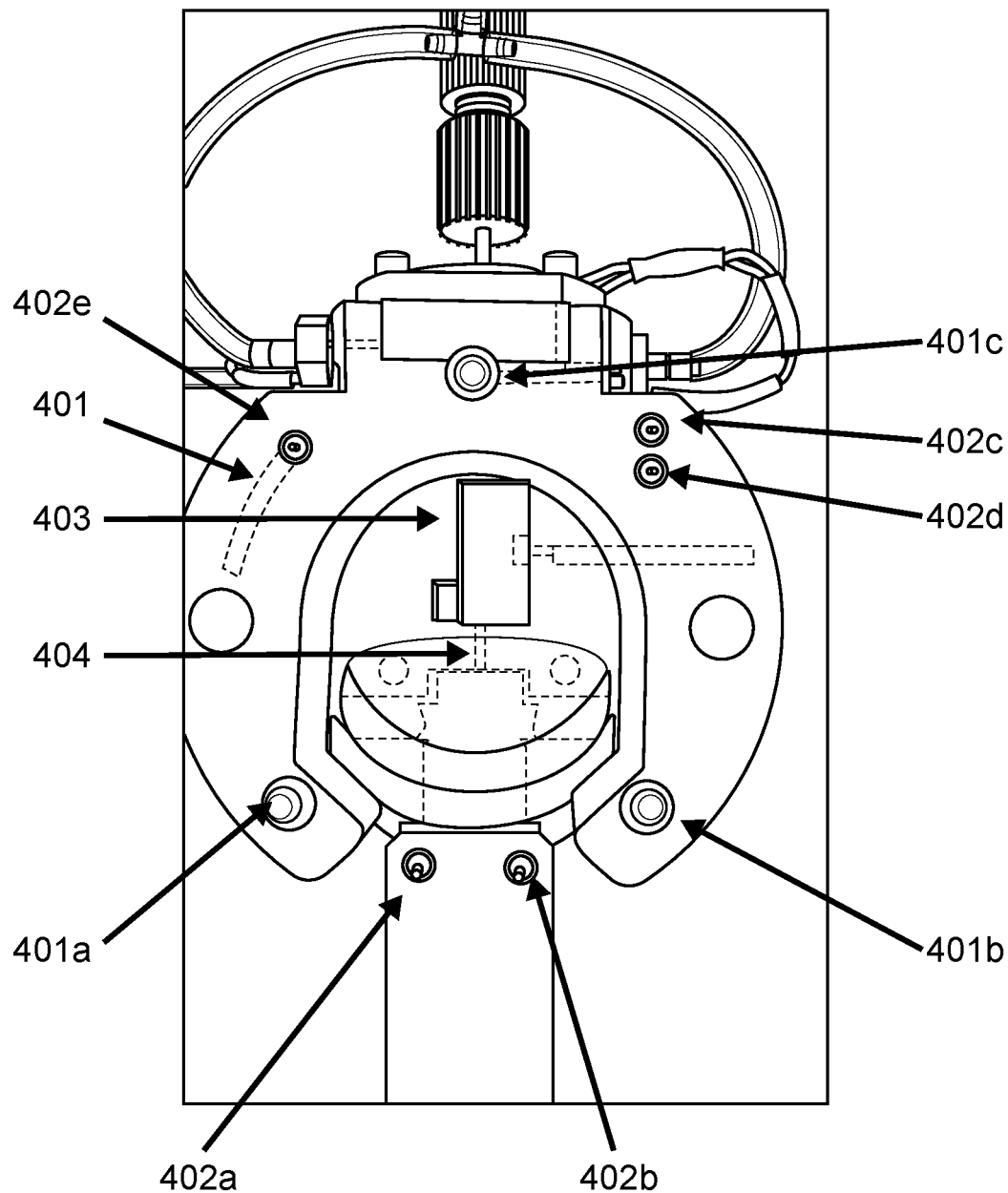
FIG. 4 depicts a side view of a particle sorting module housing according to certain embodiments.

FIG. 4 depicts a side view of a particle sorting module housing according to certain embodiments. Particle sorting module 400 includes outer wall 401 having three ball tipped pin protrusion aligners 401a, 401b and 401c that are positioned equidistantly from each other and equidistantly from the center of circular-shaped outer wall 401. Outer wall 401 also includes five electrical connector pins 402a, 402b, 402c, 402d and 402e configured to provide an electrical connection (e.g., power) to the particle sorting module (e.g., droplet deflector plates). Particle sorting module 400 also includes flow cell nozzle 403 in fluid communication with a sample input module and sample interrogation region 404 downstream from flow cell nozzle 403, which sample interrogation region can include a cuvette.

In embodiments, particle sorting modules also include a droplet deflector that is configured to divert droplets containing analyzed cells from a stream of droplets produced from the flow stream emanating from the flow nozzle to a receiving location. Diversion of a droplet of interest to a receiving location may be achieved by droplet deflector via electrostatic charging of the droplet and deflection of the charged droplet from the flow stream by the application of an electrostatic field. Such electrostatic fields may be created by deflector plates positioned adjacent to the flow stream. As used herein, the terms "deflection" or "deflected" refer to the electrostatic deflection of droplets of interest from an analyzed flow stream of droplets, such that the cells may be identified and tracked in the flow stream and only those droplets of the flow stream that include those cells of interest are diverted and collected by a container. In some instances, the particle sorting module includes droplet deflects that are configured to deflect a single droplet into each container.

The particle sorting module is configured to produce an analyzed stream of droplets and deflect each analyzed droplet from the stream of analyzed droplets to a deflected droplet receiving location. As used herein, the term "deflected droplet receiving location" refers to a location downstream from the droplet deflectors where a sorted droplet containing a cell of interest may be collected after it has been deflected by the droplet deflector plates. The subject particle sorting modules may have two or more deflector plates, as desired, such as 3 or more, such as 4 or more, such as 5 or more, such as 6 or more, such as 7 or more, such as 8 or more, such as 9 or more and including 10 or more deflector plates.

Figure 5:
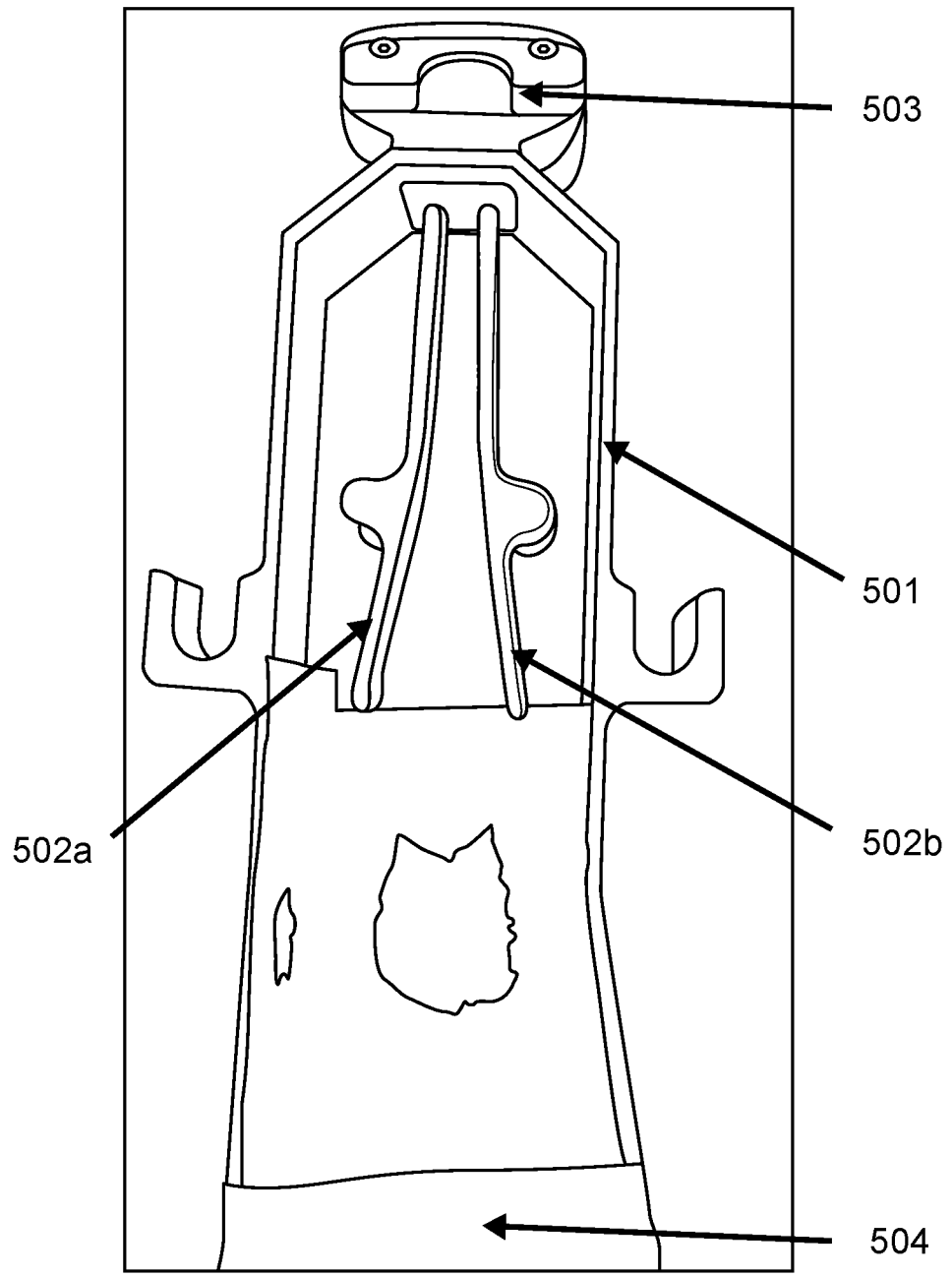
FIG. 5 depicts droplet deflector plates positioned inside of a particle sorting module according to certain embodiments.

FIG. 5 depicts droplet deflector plates positioned inside of a particle sorting module according to certain embodiments. Particle sorting module 500 includes a housing 501. Droplet deflector plates 502a and 502b are positioned inside of housing 501 and are configured to deflect particle droplets from a flow stream emanating from the proximal end 503 of housing 501 and diverting the droplets to one or more containers positioned at distal end 504 of housing 501. Particles in the flow stream may be deflected by any convenient deflector plate protocol, including but not limited to cell sorting deflector plates as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference in their entirety. In certain embodiments, the deflector plates include charged plates for sorting cells in the flow stream as used in flow cytometry systems such as the BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, or the like.

Deflector plates in particle sorting modules of interest may be configured based on the type of cells being sorted, the rate of sorting, the applied voltage to the cells as well as the number of components being sorted in the sample. In embodiments, the length of suitable deflector plates may range from 5 mm to 100 mm, such as from 6 mm to 90 mm, such as from 7 mm to 80 mm, such as from 8 mm to 70 mm, such as from 9 mm to 60 mm and including from 10 mm to 50 mm. The width of the deflector plates may vary, ranging from 1 mm to 25 mm, such as from 2 mm to 20 mm, such as from 3 mm to 15 mm and including from 5 mm to 10 mm. The distance between each deflector plate may vary depending on the applied voltage as well as the size of the particles being sorted in the flow stream. In some embodiments, the distance between each deflector plate may be 1 mm or more, such as 2 mm or more, such as 3 mm or more, such as 4 mm or more, such as 5 mm or more and including 10 mm or more. For example, the distance between each deflector plate may range from 1 mm to 25 mm, such as from 2 mm to 22.5 mm, such as from 3 mm to 20 mm, such as from 4 mm to 17.5 mm and including from 5 mm to 15 mm. The deflector plates may also be oriented at an angle to each other, such as an angle from 15° to 75°, such as from 20° to 70°, such as from 25° to 65° and including at an angle of from 30° to 60°.

The voltage applied to deflector plates to divert charged particles (as described in greater detail below) may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more and including 10000 mV or more. In certain embodiments, the applied voltage to the deflector plates ranges from 0.001 V to 6000 V, including 0.001 V to 5000 V, such as from 0.01 V to 4000 V, such as from 0.1 V to 3000 V, such as from 1 V to 2000 V, such as from 5 V to 1500 V, such as from 10 V to 1000 V, such as from 25 V to 750 V and including from 100 V to 500 V.

The deflection plates are configured to divert particles from the flow stream to a receiving location downstream from the deflection plates. In embodiments, the deflection plates may divert each particle by an angle that varies. In some embodiments, the deflection plates are configured to deflect each particle by an angle of 0.5 degrees or more from the longitudinal axis of the flow stream, such as 1 degree or more, such as 1.5 degrees or more, such as 2 degrees or more, such as 2.5 degrees of more, such as 3 degrees or more, such as 5 degrees or more, such as 7.5 degrees or more and including deflecting each particle by an angle of 10 degrees or more from the longitudinal axis of the flow stream. For example, each particle may be diverted from the longitudinal axis of the flow stream by an angle from 0.1 degrees to 30 degrees, such as from 0.5 degrees to 25 degrees, such as from 1 degree to 20 degrees, such as from 2 degrees to 15 degrees and including from 5 degrees to 10 degrees.

In some embodiments, the distal end of the subject particle sorting modules is configured for coupling to one or more containers for collecting the deflected particle droplets from the flow stream. For example, the distal end of the particle sorting modules may be configured for coupling to 2 or more containers, such as 3 or more containers, such as 4 or more containers, such as 5 or more containers, such as 6 or more containers, such as 10 or more containers and including 25 or more containers. In some instances, the distal end of the housing may include one or more aligners for coupling the housing to a container. Suitable aligners for coupling the distal end of the housing to a container may include but are not limited to an alignment protrusion, an alignment rail, an alignment notch, an alignment groove, an alignment slot, an alignment countersink, an alignment counter-bore, an alignment recess, an alignment hole or a combination thereof. In some embodiments, the distal end of the housing also includes one or more fasteners for attaching the container to the distal end of the housing. Suitable fasteners may include, but are not limited to magnets, hook and loop fasteners, latches, notches, grooves, pins, tethers, hinges, Velcro, non-permanent adhesives or a combination thereof. In certain embodiments the distal end of the housing includes a screw-thread for coupling a container by screw-threading the container to the housing.

In certain embodiments, the particle sorting module includes one or more containers at the distal end of the housing that receive the deflected particle droplets from the flow stream. For example, the particle sorting device, according to these embodiments may include 2 or more containers, such as 3 or more containers, such as 4 or more containers, such as 5 or more containers, such as 6 or more containers, such as 10 or more containers. In some embodiments, the container is mechanically coupled to distal end of the housing such as by a luer-lok connection, a sterile tube weld or by being screw threaded to the housing. In other embodiments, the container is affixed to the distal end of the housing by a permanent or non-permanent adhesive. In still other embodiments, the container is co-molded with the particle sorting module housing. In yet other embodiments, the container is integrated together with the housing, such that the container and housing form a single unit. In yet other instances, the container may be fluidically coupled to the housing, e.g., via tubing configured to convey sorted droplets, where such embodiments may provide for sterile retrieval of sorted droplets, e.g., by pinching and cutting the fluid conveyance structure, e.g., tubing. Suitable containers for collecting droplets from the flow stream may include, but are not limited to, test tubes, conical tubes, multi-compartment containers such as microtiter plates (e.g., 96-well plates), centrifuge tubes, culture tubes, microtubes, caps, cuvettes, bottles, rectilinear polymeric containers, and bags, among other types of containers.

Figure 6:
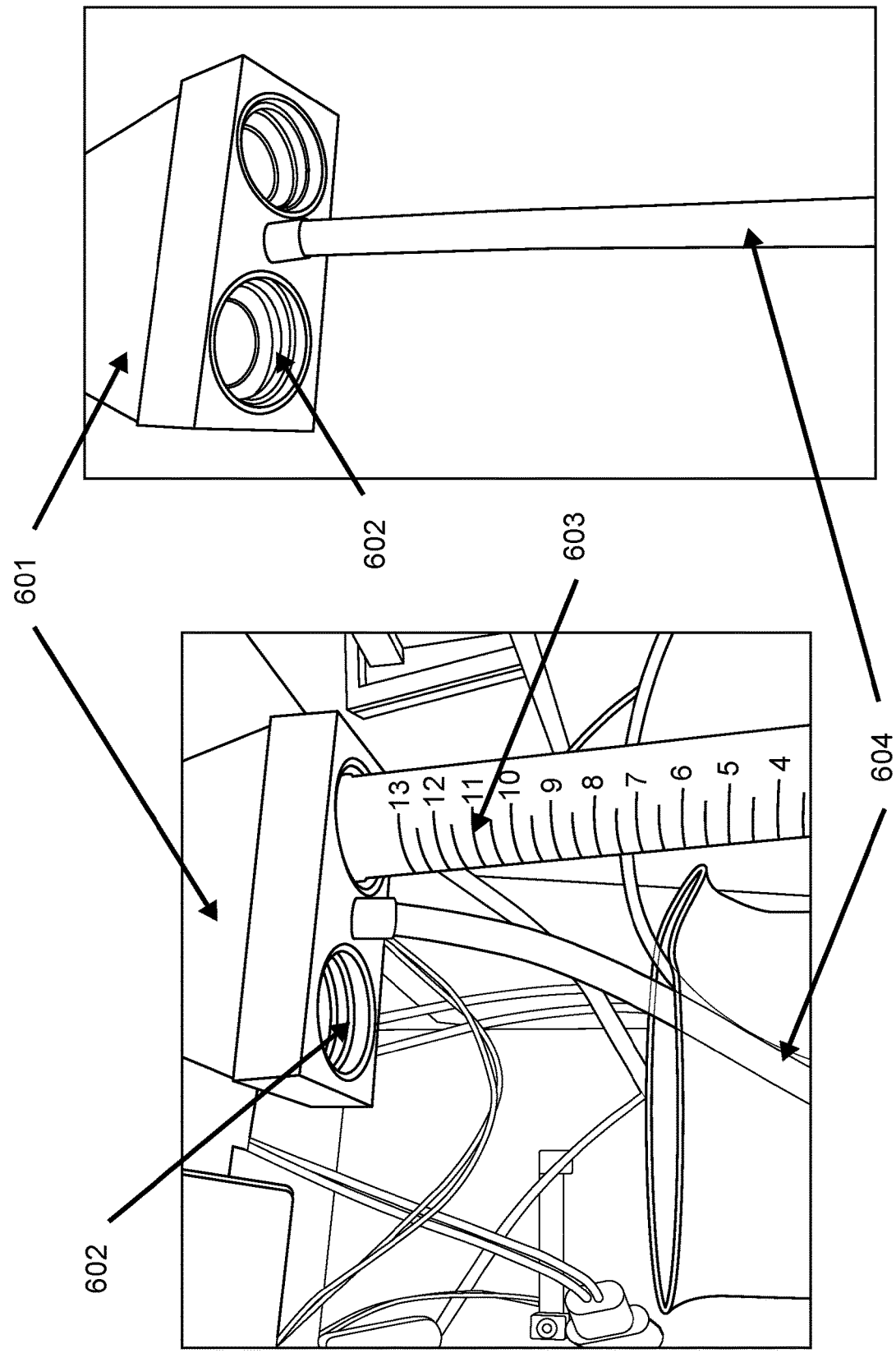
FIG. 6 depicts the distal end of a particle sorting module according to certain embodiments.

FIG. 6 depicts the distal end of a particle sorting module according to certain embodiments. Particle sorting module housing 601 includes at the distal end screw-thread fasteners 602 for coupling a container 603 to the particle sorting module housing 601. The distal end of particle sorting module 601 also includes a conduit 604 extending from the distal end of the housing to a waste tank (not shown).

Figure 7:
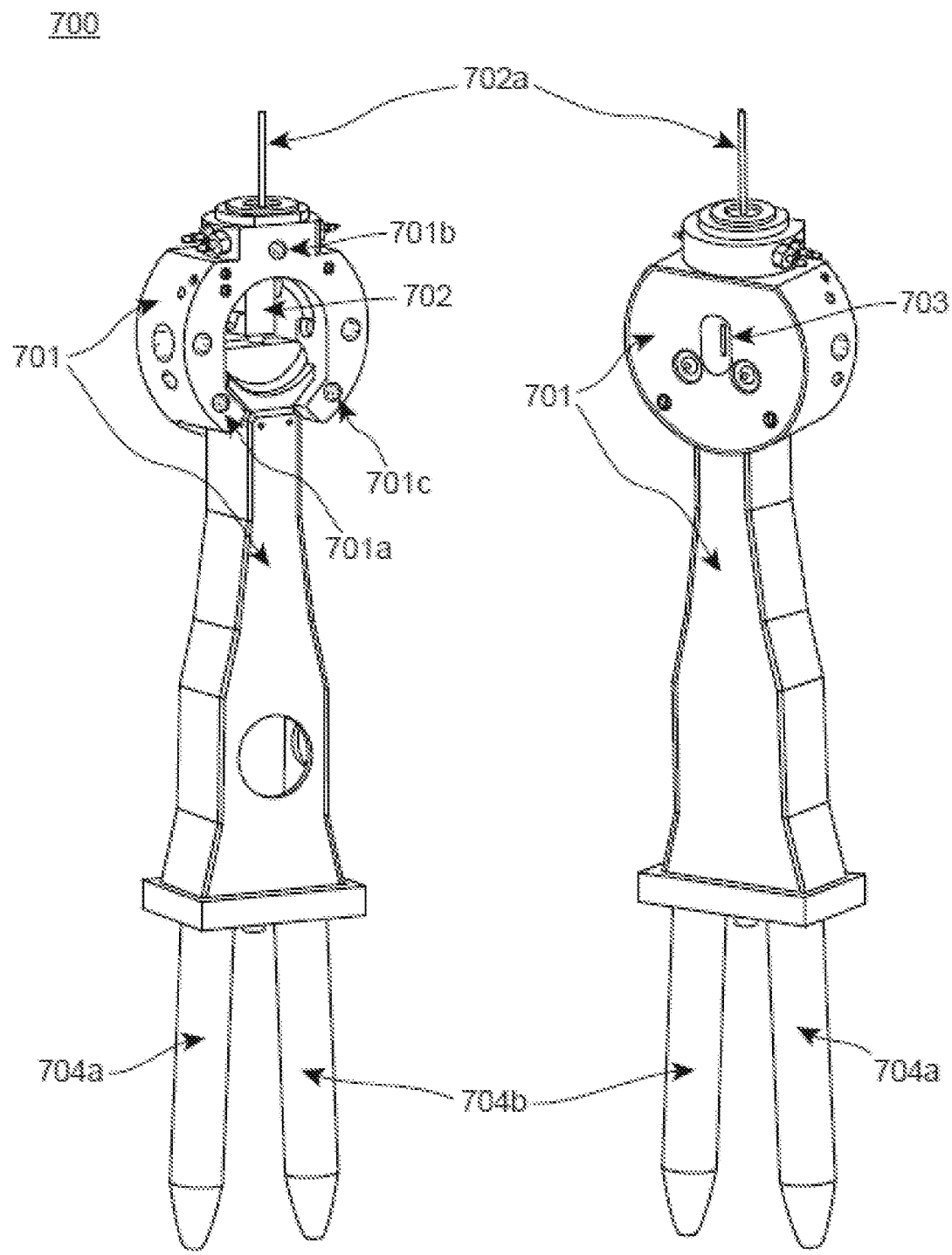
FIG. 7 depicts a particle sorting module coupled to two containers according to certain embodiments.

FIG. 7 depicts a particle sorting module coupled to two containers according to certain embodiments. Particle sorting module 700 includes a housing having outer walls 701 with aligners 701a, 701b and 701c configured for coupling the particle sorting module to a particle sorting system. Particle sorting module 700 also includes a flow nozzle 702 with sample inlet 702a which is in fluid communication with a sample interrogation region 703. Downstream from sample interrogation region 703 are droplet deflector plates (not shown) that divert particle droplets from the flow stream emanating from the flow nozzle. Droplets are collected at the distal end of housing with containers 704a and 704b that are coupled to the particle sorting module (e.g., by screw threading the containers to the distal end of the housing).

Figure 8:
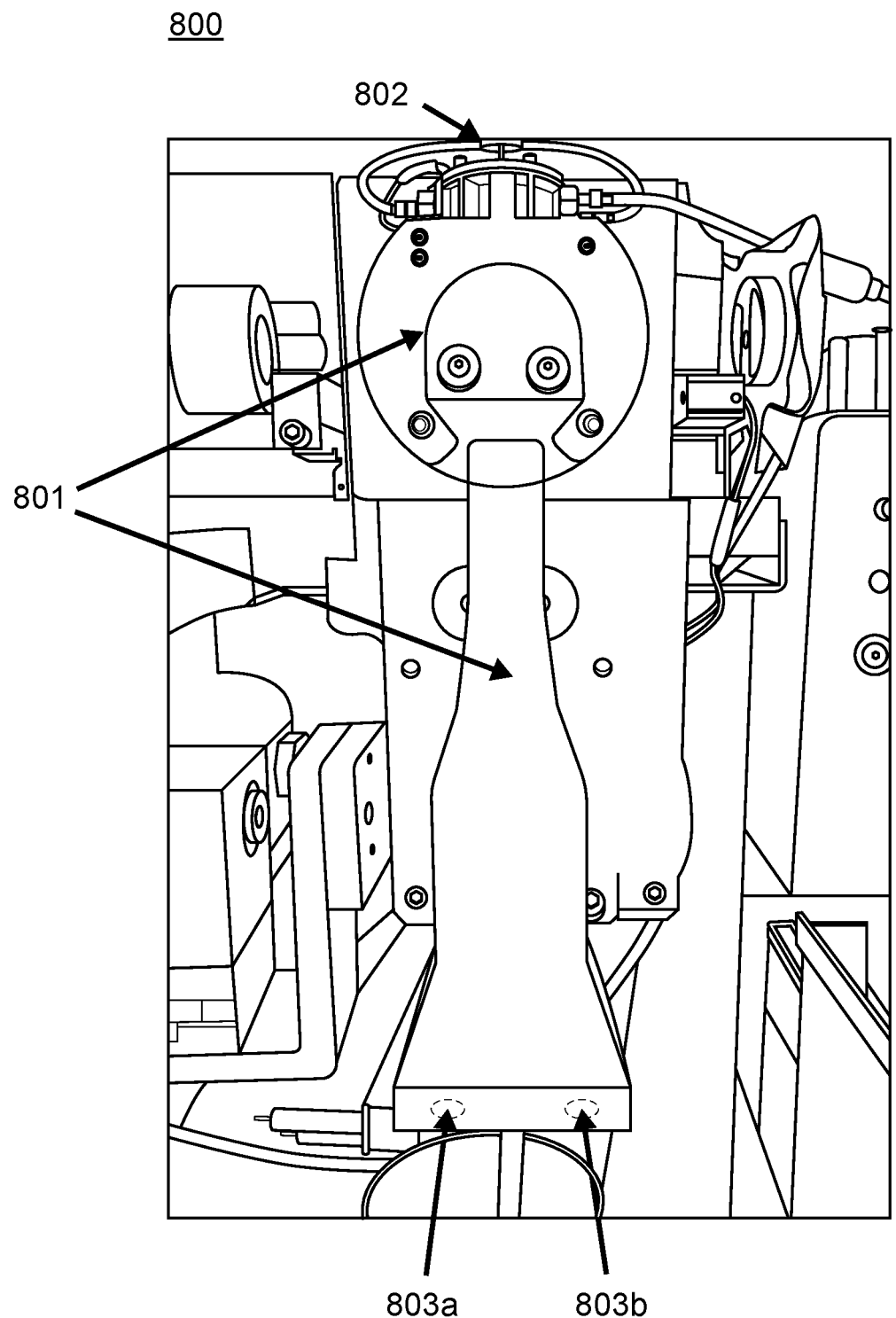
FIG. 8 depicts a side view of a particle sorting module according to certain embodiments.

FIG. 8 depicts a side view of a particle sorting module according to certain embodiments. Particle sorting module 800 includes a housing with outer walls 801 having a proximal portion that is coupled to a particle sorting module and a distal portion enclosing droplet deflector plates for sorting particle components of a fluid sample. The proximal end of particle sorting module 800 includes an inlet 802 for inputting a sample fluid. The distal end of particle sorting module 800 includes two screw-thread fasteners 803a and 803b for coupling containers to the distal end of housing 801.

Also of interest as containers are pliant sample containers, such as bags, e.g., sterile bags. By pliant is meant that the sample container may be bent or flexed from its original shape without any significant structural changes, such as tearing, cracking, perforating, etc. For example, a pliant sample container may be flexed and/or deformed from its original shape, while still maintaining a sealed barrier preventing contact between a fluid inside the sample container and the surrounding environment. In some cases, the pliant sample container is made from a flexible material that has a Young's modulus of 1 GPa or less, such as 0.7 GPa or less, including 0.5 GPa or less, for instance, 0.3 GPa or less, or 0.1 GPa or less, such as 0.05 GPa or less, or 0.01 GPa or less. In certain embodiments, the fluid in the pliant sample container is sterile, i.e., free or substantially free from live bacteria or other microorganisms. In certain embodiments, a buffer may be contained within a container, such as a cryocontainer. Containers of interest include containers that are Ethinyl Vinyl Acetate (EVA) based, such as EVA freezing bag, such as a CRYOCTYTE™ freezing bag (Baxter Healthcare Corporation, Deerfield, Ill.), CELL-FREEZE® cryogenic freezing bag (Charter Medical, Winston-Salem, N.C.), ORiGEN CRYOSTORE™ freezing bag (OriGen BioMedical, Austin, Tex.), and the like.

Any of the fluidic connections with respect to the sorting module, e.g., within the sorting module and/or between the sorting module and other aspects of the systems, e.g., receiving containers (such as bags), input tubes, etc., may be made using sterile tube welding, as desired. Any convenient sterile tube welding system and materials may be employed.

Particle Sorting Systems

Aspects of the present disclosure also include systems for sorting particle components of a sample, such as cells in a biological sample. Systems according to certain embodiments include one or more particle sorting modules as described above, a sample input module fluidically coupled to an inlet at the proximal end of the particle sorting module and a waste tank fluidically coupled to an outlet from the particle sorting module. In embodiments, the system is configured to be coupled with one or more of the particle sorting modules described above. To connect the particle sorting module, the system may include a register configured for coupling with the aligners on the housing of the particle sorting module. The register may include one or more aligners that are complimentary to the aligners on the housing of the particle sorting system. For example, the register may include 2 or more aligners, such as 3 or more aligners, such as 4 or more aligners, such as 5 or more aligners, such as 7 or more aligners and including 10 or more aligners. In certain embodiments, the particle sorting system register includes 3 aligners.

The aligners on the register are complementary to the aligners on the housing of the particle sorting module. For example, where the aligners on the particle sorting module are pins or protrusions, the aligners on the particle sorting system register are grooves or holes. In other embodiments, where the aligners on the particle sorting module are holes or notches, the aligners on the particle sorting system register are pins or protrusions. As such, the register may include one or more alignment protrusion, alignment rail, alignment notch, alignment groove, alignment slot, alignment countersink, alignment counter-bore, alignment recess, alignment hole or a combination thereof. The shape of the aligners may vary, where cross-sectional shapes of interest include, but are not limited to rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, the register includes holes that have rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In one example, the register includes an alignment hole that has the shape of a cone (i.e. a registration cone). In another example, the register includes an alignment hole in that has a shape of a shallow cylinder (i.e., a registration flat). In yet another example, the register includes a "V" shaped alignment hole (i.e., registration vee). In certain instances, the register includes a registration flat, a registration cone and a registration vee.

The size of each aligner may vary, where the width of each ranges in some instances from 1 mm to 25 mm, such as from 2 mm to 22 mm, such as from 3 mm to 20 mm, such as from 4 mm to 17 mm and including from 5 mm to 15 mm. The length of each aligner ranges from 1 mm to 50 mm, such as from 2 mm to 45 mm, such as from 3 mm to 40 mm, such as from 4 mm to 35 mm, such as from 5 mm to 30 mm and including from 10 mm to 20 mm. Where the aligner on the register is a hole, the depth of the hole may range from 1 mm to 25 mm, such as from 2 mm to 22 mm, such as from 3 mm to 20 mm, such as from 4 mm to 17 mm and including from 5 mm to 15 mm. Each aligner may have the same or different dimensions depending on the size of complimentary aligner on the particle sorting module. In some embodiments, each aligner on the particle sorting system register is the same size. In other embodiments, each aligner on the particle sorting system register is a different size. In yet other embodiments, two or more aligners are the same size and one or more aligners have a different size.

The register on the particle sorting system may also include one or more fasteners for maintaining the particle sorting module in contact with the particle sorting system. Suitable fasteners may include, but are not limited to magnets, hook and loop fasteners, Velcro, non-permanent adhesives or a combination thereof. In certain embodiments, the register includes one or more magnets for coupling to one or more magnets on the particle sorting module. In these embodiments, alignment between the register and the particle sorting module may be achieved by coupling the magnets on the register with the magnets on the outer wall of the particle sorting module housing. In some embodiments, the register and particle sorting module include both aligners and magnets. In other embodiments, the aligner includes one or more magnets, such as a protrusion (e.g., ball tipped pin protrusion) that has a magnet at the tip. In certain embodiments, the aligner is a magnet, such as a magnetic protrusion, a magnetic ball at the tip of a pin protrusion or a magnet positioned within a hole or a recess.

Where the register of the particle sorting system and particle sorting module housing include one or more magnets, the magnets on the particle sorting module housing are placed into physical contact with the magnets positioned on the register to couple the particle sorting module and the particle sorting system together. In certain embodiments, the magnets positioned on the particle sorting module housing and the register of the particle sorting system are disk shaped and alignment of the particle sorting system register and particle sorting module housing is achieved when each magnet of the particle sorting system register is coupled with each magnet on the particle sorting module housing. By placing the magnets of the particle sorting module housing into contact with the magnets of the particle sorting system register, the particle sorting module is aligned and releasably attached to the particle sorting system by the magnetic attraction between each set of magnet contacts.

Figure 9:
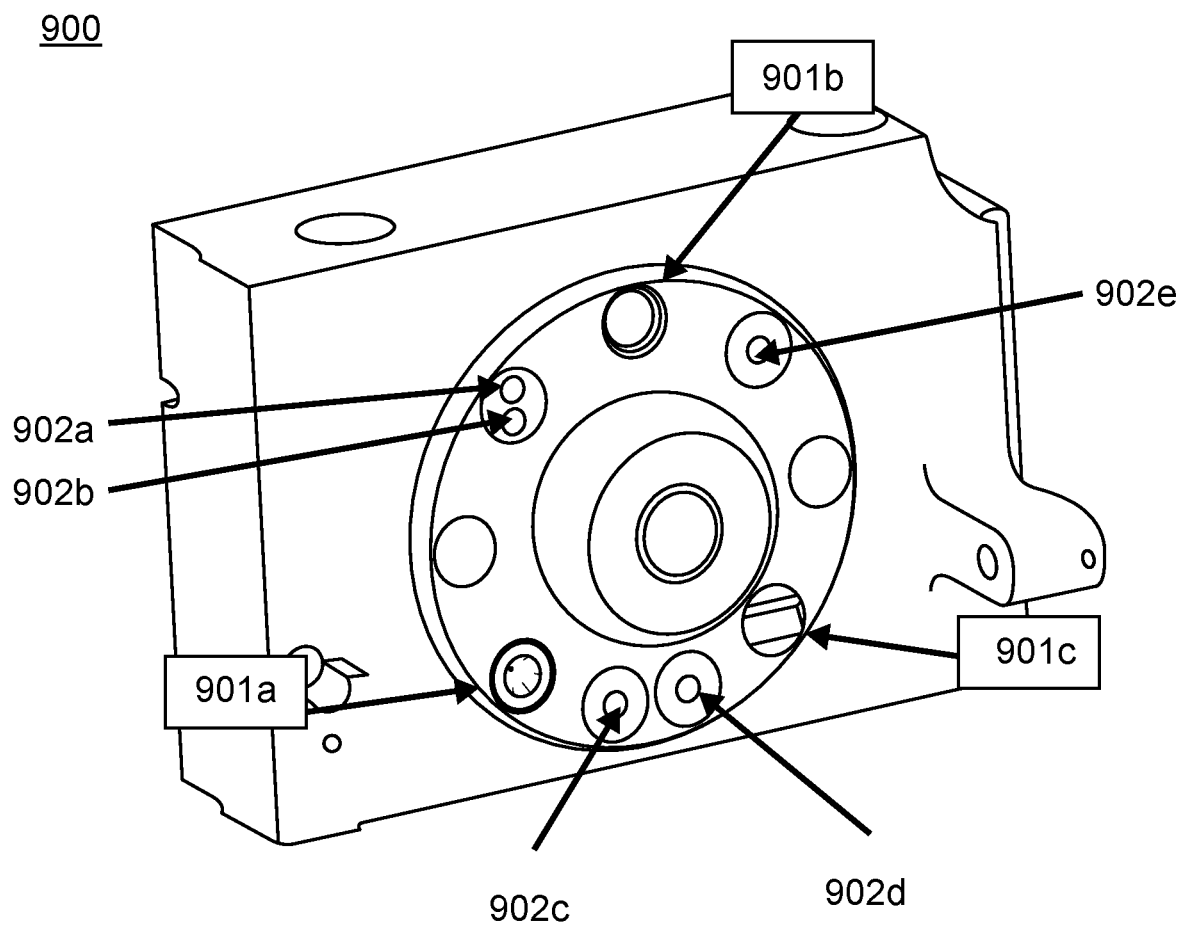
FIG. 9 depicts a particle sorting system register configured for coupling to a particle sorting module according to certain embodiments.

FIG. 9 depicts a particle sorting system register configured for coupling to a particle sorting module according to certain embodiments. Particle sorting system register 900 includes three aligners, a registration cone 901a, a registration flat 901b and a registration vee 901c. Particle sorting system register 900 also includes conductive elements 902a, 902b, 902c, 902d and 902e for contact with electrical connectors on the particle sorting module to provide power to the particle sorting module (e.g., droplet deflector plates).

Figure 10:
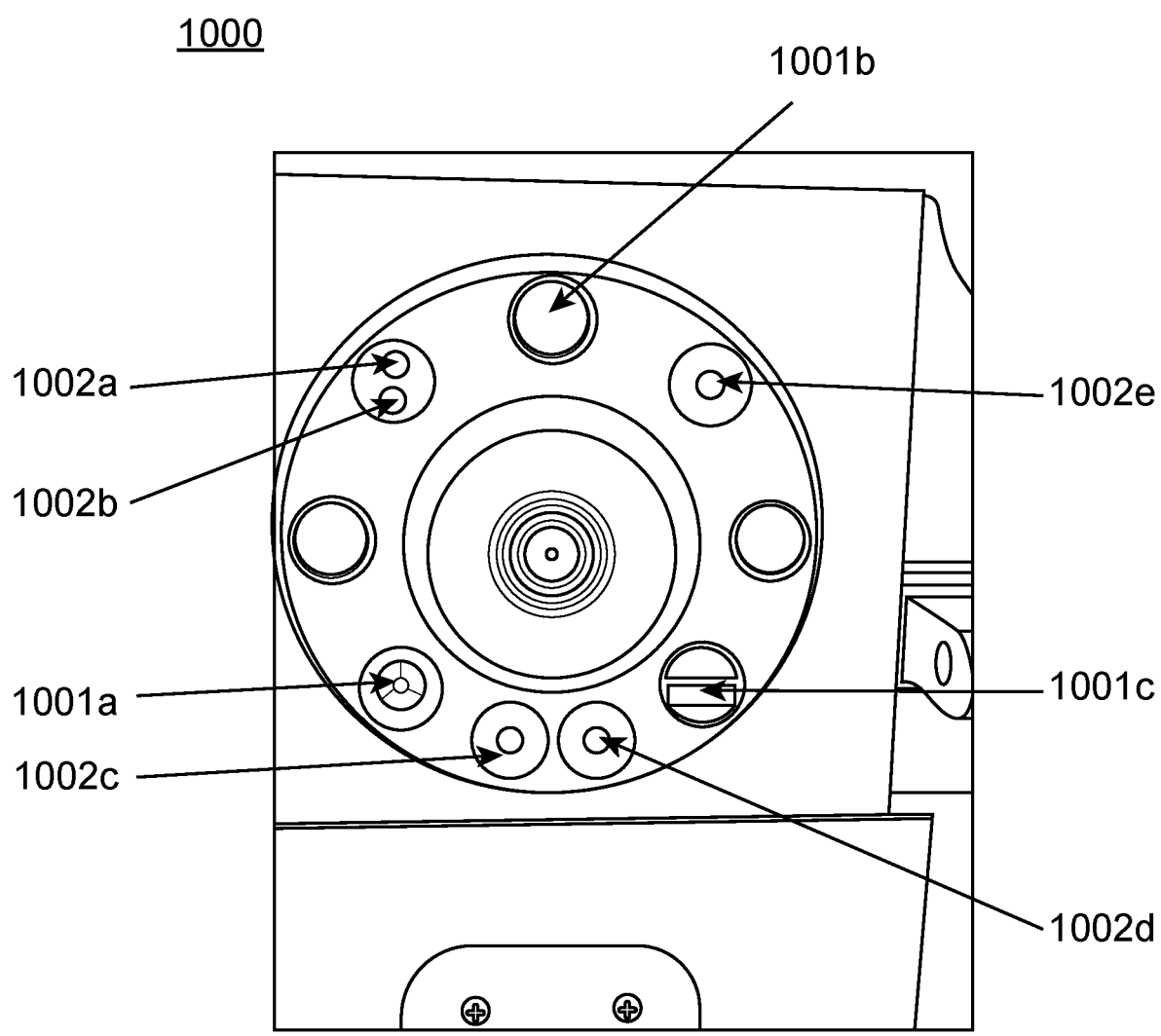
FIG. 10 depicts a side view of a particle sorting system register configured for coupling to a particle sorting module according to certain embodiments.

FIG. 10 depicts a side view of a particle sorting system register configured for coupling to a particle sorting module according to certain embodiments. Particle sorting system register 1000 includes three aligners, a registration cone 1001a, a registration flat 1001b and a registration vee 1001c. Particle sorting system register 1000 also includes conductive elements 1002a, 1002b, 1002c, 1002d and 1002e for contact with electrical connectors on the particle sorting module to provide power to the particle sorting module (e.g., droplet deflector plates).

As summarized above, systems also include a sample input module fluidically coupled to an inlet at the proximal end of the particle sorting module. In embodiments, the sample input module is configured to provide a suitable flow of sample to the flow cell nozzle chamber in the particle sorting module. Depending on the desired characteristics of the flow stream emanating from the flow nozzle, the rate of sample conveyed to the particle sorting module by the sample input module may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, wherein in some instances the flow rate is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

In embodiments, the sample fluid input includes a container, a cap and one or more ports into the interior cavity of the container. The container has a distal end and a proximal end with walls between the distal end and proximal end that together form an inner cavity within the container. In some embodiments, the outer walls of the container and inner cavity have the same cross-sectional shape where cross-sectional shapes of interest include, but are not limited to curvilinear cross-sectional shapes, e.g., circles, ovals, rectilinear cross sectional shapes, e.g., squares, rectangles, trapezoids, triangles, hexagons, etc., as well as irregular shapes, e.g., a parabolic bottom portion coupled to a planar top portion. For example, both the outer walls of the container and the inner cavity may have circular or oval cross sections or both the outer walls of the container and the inner cavity may have polygonal (e.g., octagonal) cross sections. In other embodiments, the outer walls and inner cavity of the container have different cross-sectional shapes (e.g., container having a polygonal cross-section and inner chamber having a circular cross-section). In certain embodiments, the container is a tube and the cross-sectional shape the outer walls and the inner walls are both circular.

The size of the inner cavity of the container may vary depending on the sample size and size of particle sorting module, where in some instances the length of the inner cavity of the container may range from 1 cm to 25 cm, such as from 2.5 cm to 22.5 cm, such as from 5 cm to 20 cm, such as from 7.5 cm to 17.5 cm and including from 10 cm to 15 cm and the width of the inner cavity of the container may range from 1 cm to 20 cm, such as from 2 cm to 17.5 cm, such as from 3 cm to 15 cm, such as from 4 cm to 12.5 cm and including from 5 cm to 10 cm. Where the inner cavity of the container has a cylindrical cross-section, the diameter may vary, in some embodiments, ranging from 1 cm to 10 cm, such as from 2 cm to 9 cm, such as from 3 cm to 8 cm and including from 4 cm to 7 cm. Accordingly, the volume of the container may vary, ranging from 1 to 500 $cm^3$, such as 5 to 250 $cm^3$, such as 10 to 200 $cm^3$, such as 15 to 150 $cm^3$, such as 20 to 125 $cm^3$ and including from 25 to 100 $cm^3$. In some embodiments, the container of the sample input module is a tube having a volume ranging from 1 mL to 500 mL, such as from 2 mL to 400 mL, such as from 3 mL to 300 mL, such as from 4 mL to 200 mL, such as from 5 mL to 150 mL and including from 10 mL to 100 mL.

The container may be formed from any suitable material including, but not limited to, glass, metal or plastic, such as a flexible or rigid plastic, polymeric or thermoplastic materials, e.g., as described above.

In embodiments, containers of the sample input module also include a cap configured to close off the proximal end of the container. For example, the cap may be a screw cap, a snap-on cap or a cap which connects the container by a permanent, semi-permanent or non-permanent adhesive. In certain instances, the cap forms a fluidic seal with the walls of the container. The cap may be an integrated part of the container, including where the cap is molded with, soldered, welded or affixed to the container using a permanent adhesive. In other embodiments, the cap is releasably attached to the container. By "releasably" is meant that the cap can be freely detached from and re-attached to the proximal end of the container. Where the cap is releasably attached to the container, the cap may be non-permanently fastened to the container by any convenient attachment protocol, including but not limited to a hook and loop fastener, a latch, a notch, a groove, a pin, a tether, a hinge, Velcro, non-permanent adhesive, a threaded screw, or a combination thereof. In certain instances, the container includes a threaded outer wall and is screw threaded with the internal walls of the cap.

The cap may include one or more ports into the inner cavity of the container, such as 2 or more ports, such as 3 or more ports, such as 4 or more ports and including 5 or more ports. In certain embodiments, the cap includes two ports. The ports may be any convenient port configured for fluidic or gaseous communication with the inner cavity of the container. In some embodiments, the cap includes a port configured to convey gas into the container to create positive pressure within the container and to convey sample fluid from within the container through a second port to the particle sorting module. In some instances, the container includes a third opening in the cap to allow air to vent.

Any suitable port configuration may be employed depending on the desired function of the port, where examples of ports include channels, orifices, channels having a check valve, a Luer taper fitting, a port with a breakable seal (e.g., single use ports) among other types of ports. In certain embodiments, the port is configured with a Luer taper fitting, such as a Luer-Lok or a Luer-slip. Ports in the cap of the sample input module may be any suitable shape, where cross-sectional shapes of ports of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the ports may vary, in some embodiments ranging from 1 mm to 100 mm, such as from 2 mm to 95 mm, such as from 3 mm to 90 mm, such as from 4 mm to 80 mm, such as from 5 mm to 70 mm, such as from 6 mm to 60 mm and including from 10 mm to 50 mm. In some embodiments, the port is a circular orifice and the diameter of the port ranges from 1 mm to 100 mm, such as from 2 mm to 90 mm, such as from 4 mm to 80 mm, such as from 5 mm to 70 mm, such as from 6 mm to 60 mm and including from 10 mm to 50 mm. Accordingly, depending on the shape of the ports, ports in the cap may have an opening which ranges from 0.01 mm$^2$ to 250 mm$^2$, such as from 0.05 mm$^2$ to 200 mm$^2$, such as from 0.1 mm$^2$ to 150 mm$^2$, such as from 0.5 mm$^2$ to 100 mm$^2$, such as from 1 mm$^2$ to 75 mm$^2$, such as from 2 mm$^2$ to 50 mm$^2$ and including from 5 mm$^2$ to 25 mm$^2$.

Figure 11:
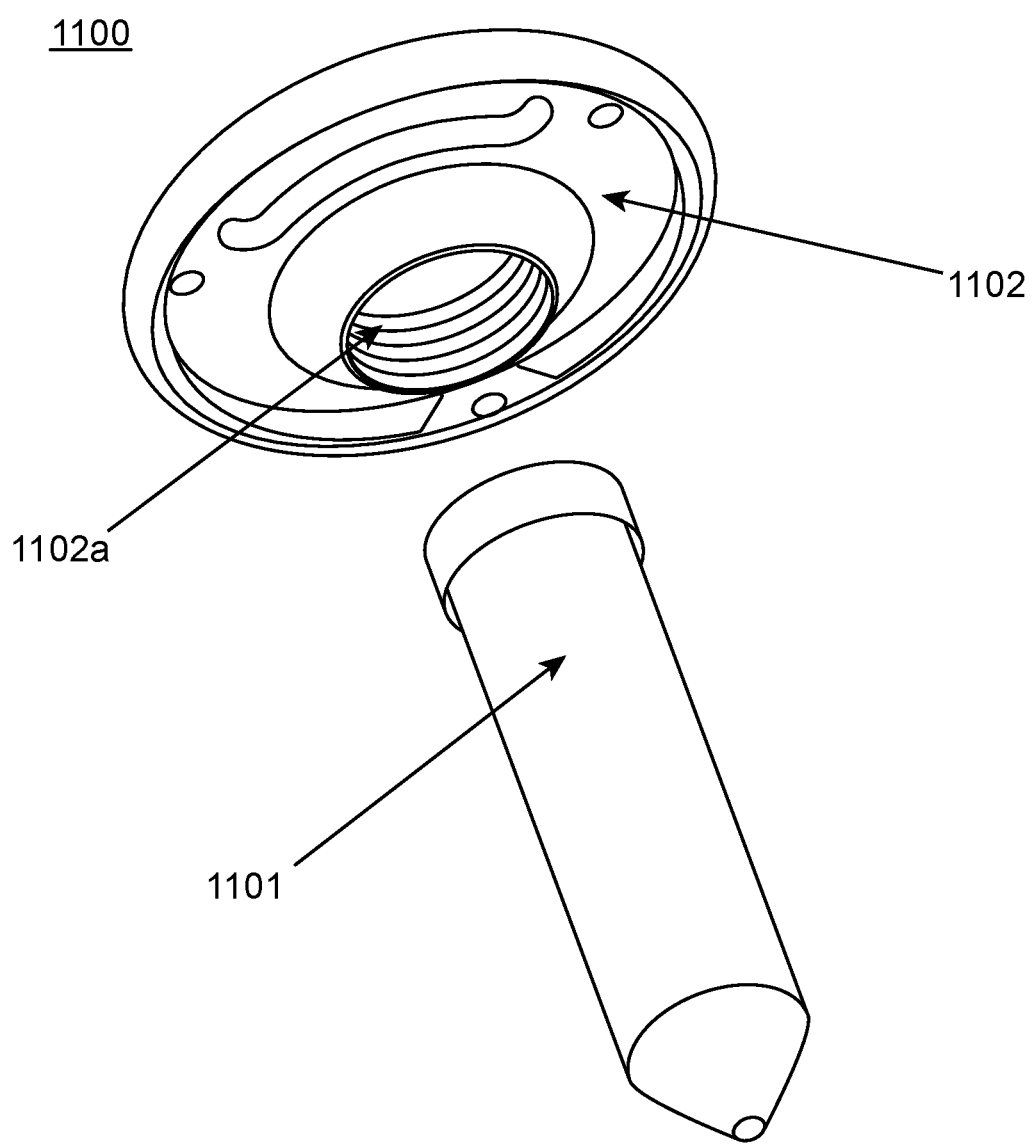
FIG. 11 depicts a sample input module configured to be fluidically coupled to an inlet of a particle sorting module according to certain embodiments.

FIG. 11 depicts a sample input module configured to be fluidically coupled to an inlet of a particle sorting module according to certain embodiments. Sample input module 1100 includes a container 1101 (e.g., conical tube) for storing sample fluid conveyed to the particle sorting module and cap 502 configured to close off the proximal end of container 1101. Cap 1102 includes screw thread 1102a for fastening cap 1102 to container 1101.

Figure 12:
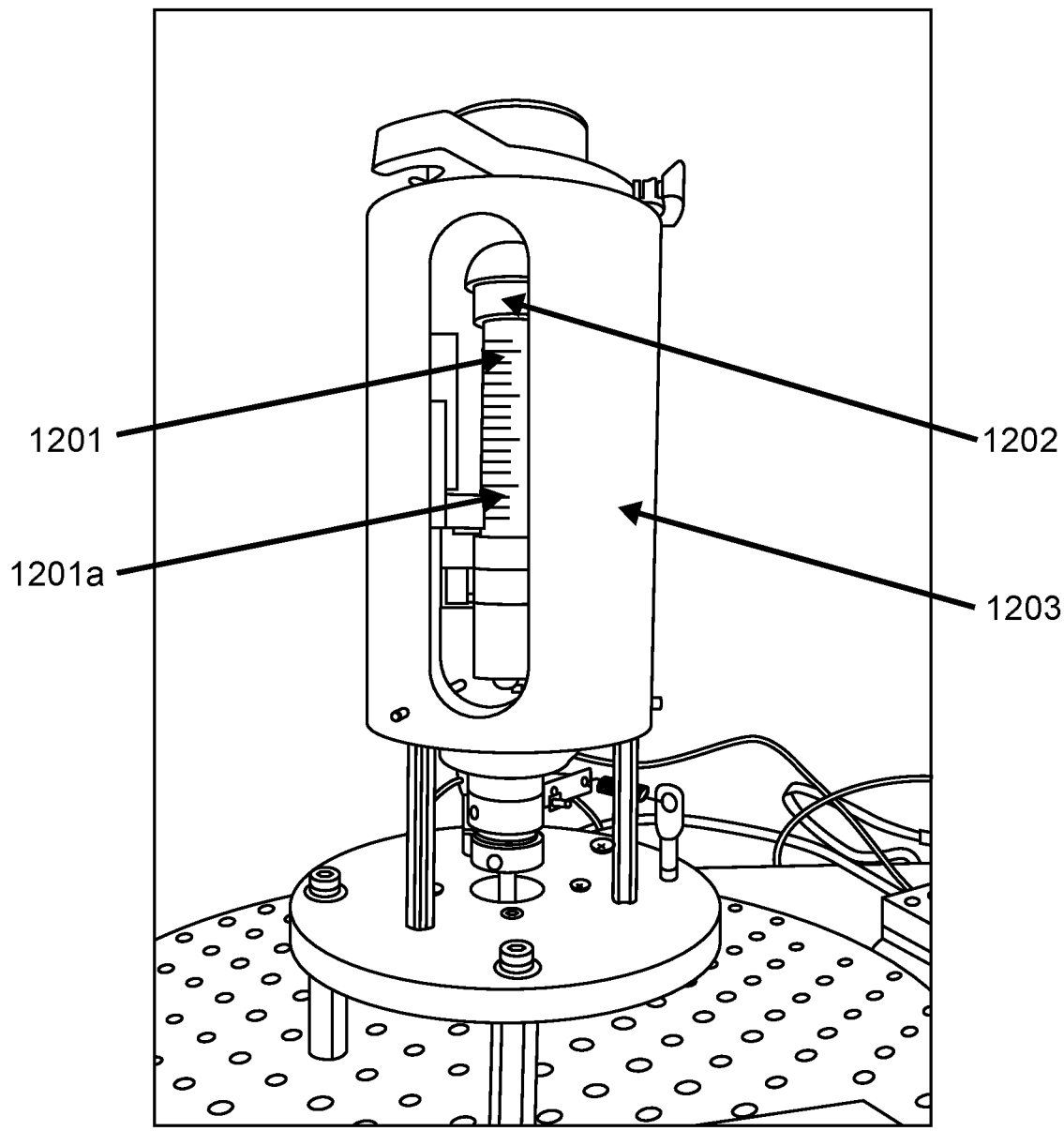
FIG. 12 depicts a sample input module configured to convey sample fluid to a particle sorting module according to certain embodiments.

FIG. 12 depicts a sample input module configured to convey sample fluid to a particle sorting module according to certain embodiments. Sample input module 1200 includes a container 1201 for storing sample fluid 1201a that is conveyed to the particle sorting module and cap 1202 configured to close off the proximal end of container 1201. Sample input module 1200 may be positioned in a sample agitator 1203 which agitates sample fluid 1201a. Sample agitator 1203 provides for sample agitation by moving the bottom of container 1201 around an eccentric circular path while a cap, e.g., such as 1102, has a ball feature that provides for articulation at the top of the agitor, where the cap may be held in place by compression, magnets, etc. Agitator 1203 also provides for temperature modulation, e.g., via a thermoelectric temperature regulatory system.

In some embodiments, the sample input module includes one or more conduits in fluid communication with the interior cavity of the container through the one or more ports in the cap. For example, the sample input module may include 2 or more conduits, such as 3 or more conduits and including 5 or more conduits. Each conduit includes a proximal end in contact with the interior cavity of the container and a distal end having an opening for inputting or outputting gas or fluid. In some instances, the sample input module includes an inlet conduit for conveying a gas into the container and an outlet conduit for conveying sample fluid from the container to the particle sorting module. In other instances, the sample input module includes two inlet conduits for conveying gas into the container and one outlet conduit for conveying sample fluid from the container to the particle sorting module.

Each conduit may have a length that varies and independently, each conduit may be 5 cm or more, such as 7 cm or more, such as 10 cm or more, such as 25 cm or more, such as 30 cm or more, such as 50 cm or more, such as 75 cm or more, such as 100 cm or more, such as 250 cm or more and including 500 cm or more. The lumen diameter of each conduit may also vary and may be 0.5 mm or more, such as 0.75 mm or more, such as 1 mm or more, such as 1.5 mm or more, such as 2 mm or more, such as 5 mm or more, such as 10 mm or more, such as 25 mm or more and including 50 mm or more. For example, depending on the desired flow rate of conveying fluid from the container to the particle sorting module, the lumen diameter may range from 0.5 mm to 50 cm, such as from 1 mm to 25 mm and including from 5 mm to 15 mm.

Each conduit may be formed from a thin material, such as where the walls of the conduit have a thickness of 5 mm or less, such as 3 mm or less, such as 2 mm or less, including 1 mm or less, or 0.5 mm or less, such as 0.4 mm or less, such as 0.3 mm or less, such as 0.2 mm or less and including 0.1 mm or less. In certain embodiments, the conduit is formed from a flexible material having a Young's modulus of 1 GPa or less, such as 0.9 GPa or less, such as 0.8 GPa or less, such as 0.7 GPa or less, such as 0.6 GPa or less, such as 0.5 GPa or less, such as 0.4 GPa or less, such as 0.3 GPa or less, such as 0.2 GPa or less, such as 0.1 GPa or less and including 0.01 GPa or less. In certain embodiments, the conduits are formed from a polymeric material, such as, but not limited to, e.g., as described above, including but not limited to: polyvinyl chloride (PVC), ethyl vinyl acetate (EVA), polyethylene, polypropylene, combinations thereof, and the like.

Each conduit may be configured with one or more valves that may be opened and closed as desired. For example, each conduit may be configured with 2 or more valves, such as 3 or more valves, such as 4 or more valves and including 5 or more valves. Any convenient valve protocol may be employed, including but not limited to pinch valves, ball valves, butterfly valves, disc valves, clapper valves, check valves, ball check valves, diaphragm valves, lift check valves, tilted disc check valves, needle valves, piston valves, plug valves, poppet valves and spool valves. In certain embodiments, the inlet conduit for conveying gas into the container may be configured with two pinch valves. To maintain sterility of the sample, the inlet conduit to the container from the gas source may include a filter, such as a high-efficiency particulate arrestance (HEPA) filter or a filter having pores of 50 μm or smaller, such as 25 μm or smaller, such as 15 μm or smaller, such as 10 μm or smaller, such as 5 μm or smaller, such as 1 μm or smaller, such as 0.5 μm or smaller, such as 0.1 μm or smaller, such as 0.05 μm or smaller, such as 0.01 μm or smaller and including 0.001 μm or smaller.

In certain embodiments, systems further include one or more gas sources in gaseous communication with an inlet conduit of the sample input module container. In some instances, the gas source is a pressurized gas, such as, but not limited to a pressurized gas cylinder, a compressor, and the like. In certain instances, the pressurized gas has a pressure of 2 psi or more, e.g., 5 psi or more, including 10 psi or more, e.g., 15 psi or more, including 20 psi or more, where in some instances the pressure is 25 psi or more, such as 50 psi or more, or 75 psi or more, including 100 psi or more, or 125 psi or more, for example 150 psi or more. The pressurized gas may be any convenient type of gas suitable for creating a positive pressure within the container of the sample input module. For instance, the pressurized gas may include air, nitrogen, argon, and the like.

In some instances, the subject systems may include one or more valves to control the rate of output from the gas source or to prevent over-pressurizing the sample input module container. In one example, the subject systems include a check valve, such as a ball check valve, positioned between the gas source and the inlet conduit of the sample input module container. In another example, a pressure release valve may be positioned between the gas source and the inlet conduit of the sample input module container. In other instances, systems of interest include one or more gas pressure sensors to monitor gas pressure. Any convenient pressure sensing protocol may be employed and may include but is not limited to absolute pressure sensors, gauge pressure sensors, vacuum pressure sensors, differential pressure sensors, such as a piezoresistive strain gauges, capacitive pressure sensors, electromagnetic pressure sensors, piezoelectric pressure sensors, potentiometric pressure sensors, resonant pressure sensors, among other types of pressure sensors.

The subject systems, in certain embodiments, further include a feedback monitor configured to assess the flow rate of fluid outputted from the outlet conduit of the sample input module container and the gas pressure in the sample input module container. In some embodiments, feedback monitors collect real-time data about the flow rate of fluid output and gas pressure. In other embodiments, feedback monitors are configured to assess the flow rate and gas pressure at regular intervals, such as every 1 minute, every 5 minutes, every 10 minutes, every 30 minutes, every 60 minutes or some other interval.

In embodiments of the present disclosure, feedback monitors may also be configured to evaluate the flow rate of fluid outputted from the outlet conduit of the sample input module container and the gas pressure in the sample input module container and identify any desired adjustments for outputting fluid from the sample input module container, where the adjustments may in certain instances improve one or more of the flow rate, consistency and uniformity. In certain embodiments, the feedback monitor includes a processor which is configured to evaluate the flow rate of fluid outputted from the outlet conduit of the sample input module container and the gas pressure in the sample input module container and to identify if any desired adjustments are needed. In some embodiments, feedback monitors are configured to evaluate fluid flow rate and gas pressure and determine if an increase or decrease in gas input into the sample input module container is required, such as to increase or decrease fluid flow from the sample input module container. In certain instances, the feedback monitor is configured identify that a decrease or stop in gas output from the gas source is necessary or desired when the positive pressure within the sample input module container is too high or increasing too quickly. In other instances, the feedback monitor is configured to identify that an increase in gas output from the gas source is necessary or desired when the positive pressure within the sample input module container is too low or increasing too slowly.

In certain aspects, feedback monitors are configured to allow the subject systems to operate in a closed-loop fashion. For example, in some embodiments the feedback monitor may assess the flow rate of fluid outputted from the outlet conduit of the sample input module container and the gas pressure in the sample input module container and may change one or more parameters of the subject systems on a substantially real-time basis to automatically obtain more effective results as desired. In certain aspects, such a closed-loop system may involve applying one or more statistical or learning machine algorithms, such as genetic algorithms, neural networks, hidden Markov models, Bayesian networks, and the like.

In some embodiments, the sample input module includes a sample agitator. Any convenient agitation protocol may be employed including, but not limited to a sonicator, a mechanical or electrical shaker, an eccentric motion device, among other agitating protocols. In certain embodiments, the sample agitator is an eccentric motion instrument having a stepper motor and bearing (to eliminate motion) along with an off-center drive. The sample agitator may be configured to agitate the sample input module for any duration desired, such as for 1 minute or longer, such as 2 minutes or longer, such as 5 minutes or longer, such as 10 minutes or longer, such as 15 minutes or longer, such as 30 minutes or longer, such as 60 minutes or longer, such as 120 minutes or longer, such as 240 minutes or longer and including 480 minutes or longer.

The sample input module may also include a temperature controller, where the temperature of the sample in the subject sample input module may be maintained or changed (e.g., increased or decreased) as desired. For example, the temperature controller may be configured to maintain the temperature of the sample input module from −80° C. to 100° C., such as from −75° C. to 75° C., such as from −50° C. to 50° C., such as from −25° C. to 25° C., such as from −10° C. to 10° C., and including from 0° C. to 25° C. In certain aspects, the subject systems include a temperature sensor for measuring the temperature within the sample input module container and a feedback monitor configured to allow the sample input module to operate in a closed-loop fashion. For example, in some embodiments the system may assess the temperature in the sample input module and the feedback monitor may adjust the temperature (e.g., increase or decrease the temperature in the sample input module container on a substantially real-time basis to automatically obtain more effective results as desired.

As summarized above, particle sorting systems of interest also include a waste tank fluidically coupled to an outlet from the particle sorting module. In some embodiments, the waste tank includes one or more ports, such as a port for venting accumulated gas pressure in the particle sorting module, a port for collecting waste from the particle sorting module and a port for venting accumulated gas pressure in the waste tank or any combination thereof. In some embodiments, the waste tank may be in fluid communication with the particle sorting module through one or more ports. For example, the waste tank may include 2 or more ports, such as 3 or more ports, such as 4 or more ports and including 5 or more ports. In certain embodiments, the waste tank includes two ports. The ports may be any convenient port configured for fluidic or gaseous communication with the inner cavity of the waste tank. In some embodiments, the waste tank includes a port that is configured to vent (i.e., release) accumulated gas pressure from within the waste tank. In other embodiments, the waste tank includes a port that receives waste fluid from the particle sorting module. In yet other embodiments, the waste tank includes a port that is configured to vent accumulated gas pressure from within the particle sorting module, such as venting the flow cell portion of the particle sorting module.

Any suitable port configuration may be employed depending on the desired function of the port, where examples of ports include channels, orifices, channels having a check valve, a Luer taper fitting, a port with a breakable seal (e.g., single use ports) among other types of ports. In certain embodiments, the port is configured with a Luer taper fitting, such as a Luer-Lok or a Luer-slip. Ports in the waste tank may be any suitable shape, where cross-sectional shapes of ports of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the ports may vary, in some embodiments ranging from 1 mm to 100 mm, such as from 2 mm to 95 mm, such as from 3 mm to 90 mm, such as from 4 mm to 80 mm, such as from 5 mm to 70 mm, such as from 6 mm to 60 mm and including from 10 mm to 50 mm. In some embodiments, the port is a circular orifice and the diameter of the port ranges from 1 mm to 100 mm, such as from 2 mm to 90 mm, such as from 4 mm to 80 mm, such as from 5 mm to 70 mm, such as from 6 mm to 60 mm and including from 10 mm to 50 mm. Accordingly, depending on the shape of the ports, ports in the waste tank may have an opening which ranges from 0.01 $mm^2$ to 250 $mm^2$, such as from 0.05 $mm^2$ to 200 $mm^2$, such as from 0.1 $mm^2$ to 150 $mm^2$, such as from 0.5 $mm^2$ to 100 $mm^2$, such as from 1 $mm^2$ to 75 $mm^2$, such as from 2 $mm^2$ to 50 $mm^2$ and including from 5 $mm^2$ to 25 $mm^2$.

In some embodiments, the waste tank may be fluidically coupled to the particle sorting module through one or more conduits. For example, the particle sorting module may be fluidically coupled to the waste tank through 2 or more conduits, such as 3 or more conduits and including through 5 or more conduits. Conduits which couple the particle sorting module to the waste tank include a proximal end connected to the particle sorting module and a distal end connected to the waste tank.

Each conduit may have a length that varies and independently, each conduit may be 5 cm or more, such as 7 cm or more, such as 10 cm or more, such as 25 cm or more, such as 30 cm or more, such as 50 cm or more, such as 75 cm or more, such as 100 cm or more, such as 250 cm or more and including 500 cm or more. The lumen diameter of each conduit may also vary and may be 0.5 mm or more, such as 0.75 mm or more, such as 1 mm or more, such as 1.5 mm or more, such as 2 mm or more, such as 5 mm or more, such as 10 mm or more, such as 25 mm or more and including 50 mm or more. For example, the lumen diameter may range from 0.5 mm to 50 cm, such as from 1 mm to 25 mm and including from 5 mm to 15 mm.

Each conduit may be formed from a thin material, such as where the walls of the conduit have a thickness of 5 mm or less, such as 3 mm or less, such as 2 mm or less, including 1 mm or less, or 0.5 mm or less, such as 0.4 mm or less, such as 0.3 mm or less, such as 0.2 mm or less and including 0.1 mm or less. In certain embodiments, the conduit is formed from a flexible material having a Young's modulus of 1 GPa or less, such as 0.9 GPa or less, such as 0.8 GPa or less, such as 0.7 GPa or less, such as 0.6 GPa or less, such as 0.5 GPa or less, such as 0.4 GPa or less, such as 0.3 GPa or less, such as 0.2 GPa or less, such as 0.1 GPa or less and including 0.01 GPa or less. In certain embodiments, the conduits are formed from a polymeric material, such as, but not limited to, e.g., as described above, including but not limited to: polyvinyl chloride (PVC), ethyl vinyl acetate (EVA), polyethylene, polypropylene, combinations thereof, and the like.

The waste tank may include one or more chambers. In some embodiments, the waste tank has a single chamber for collecting all discarded components from the particle sorting module. In other embodiments, the waste tank has more than one chamber, such as 2 or more chambers, such as 3 or more chambers and including 4 or more chambers. Each chamber in a multi-chamber waste tank may have one or more inlet and outlet conduits. For instance, the two or more chambers may be in fluid communication with a single conduit. The lumens of the two or more chambers may be joined together at a Y-connector, a valve (e.g., a pinch valve), or the like.

Where the waste tank includes more than one chamber, each different chamber may be configured to receive the same or different fluids. For example, a first waste tank chamber may collect and contain uncharged and undeflected particles from the flow stream and a second waste tank chamber may collect and contain deflected, but uncollected particles from the flow stream. In other embodiments, a first waste tank chamber may collect and contain excess sheath fluid and discarded excess sample fluid from the flow stream and a second waste tank chamber may collect a sorted, but undesirable component of the sample fluid from the flow stream.

In some embodiments, the waste tank includes one or more ports, such as a port for venting accumulated gas pressure in the particle sorting module, a port for collecting waste from the particle sorting module and a port for venting accumulated gas pressure in the waste tank or any combination thereof. The waste stream from the particle sorting module may be conveyed to the waste tank through a conduit. The conduit may be coupled to the waste tank with a connector, such as a Luek-Lok connector or a screw fit connector.

Particle sorting systems according to certain embodiments also include a sheath fluid delivery subsystem for conveying sheath fluid to the flow cell nozzle of the particle sorting module. The term "sheath fluid" is used herein in its conventional sense to refer to fluid conveyed through a conduit (e.g., in a flow cytometer) that is used to form an annular flow coaxial with a sample-containing fluid creating a hydrodynamically focused flow of particle-containing sample fluid in the center of the sheath fluid stream. Sheath fluids of interest may be any convenient buffered composition, such as for use in a flow cytometer and may include one or more salts, including but not limited to potassium phosphate, potassium chloride, sodium phosphate, sodium chloride, preservatives as well as chelating agents, such as disodium ethylenediaminetetraacetic acid (EDTA). In embodiments, the sheath fluid dispensing system includes a fluid reservoir containing a sheath fluid, a conduit having a proximal end in fluid communication with the sheath fluid reservoir and a distal end in fluid communication with a sheath fluid input to the particle sorting module.

In some embodiments, the sheath fluid delivery subsystem includes a pressurized housing with pliant container having a reservoir for sheath fluid positioned within the housing. In other embodiments, the sheath fluid delivery subsystem includes a housing and a first pliant container and a second pliant container positioned in the housing. The first pliant container includes a fluid reservoir and a conduit having a proximal end and a distal end, where the proximal end is fluidically coupled to the fluid reservoir and the distal end is configured for coupling the conduit to the particle sorting module and the second pliant container includes a gas reservoir and a port in gaseous communication with the gas reservoir. In these embodiments, the second pliant container is positioned in the housing with the first pliant container and is configured to apply pressure to the fluid reservoir of the first pliant container to convey sheath fluid from the distal end of the conduit into the particle sorting module.

Figure 13A:
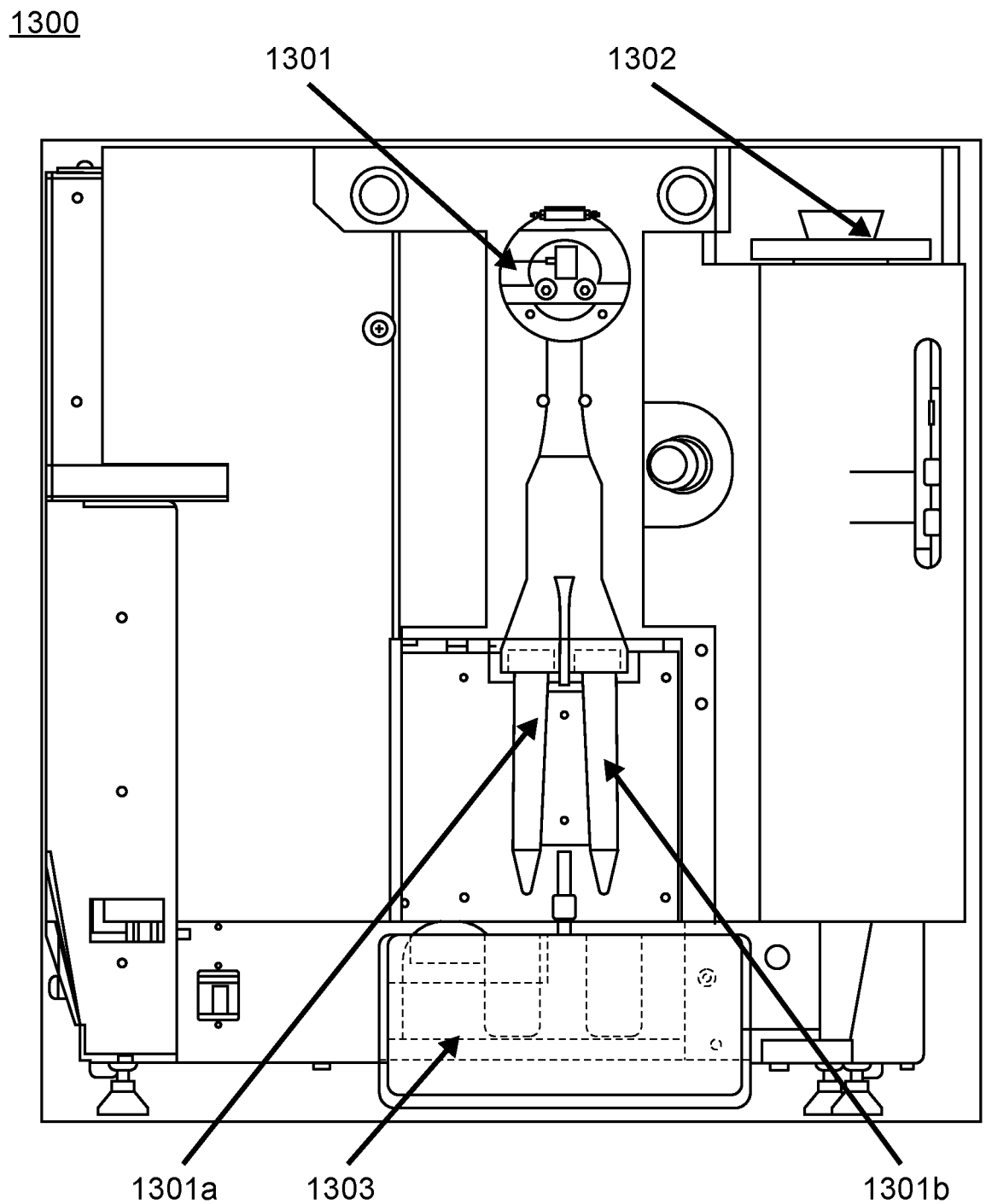
FIG. 13 depicts a particle sorting system coupled to a particle sorting module according to certain embodiments.
Figure 13B:
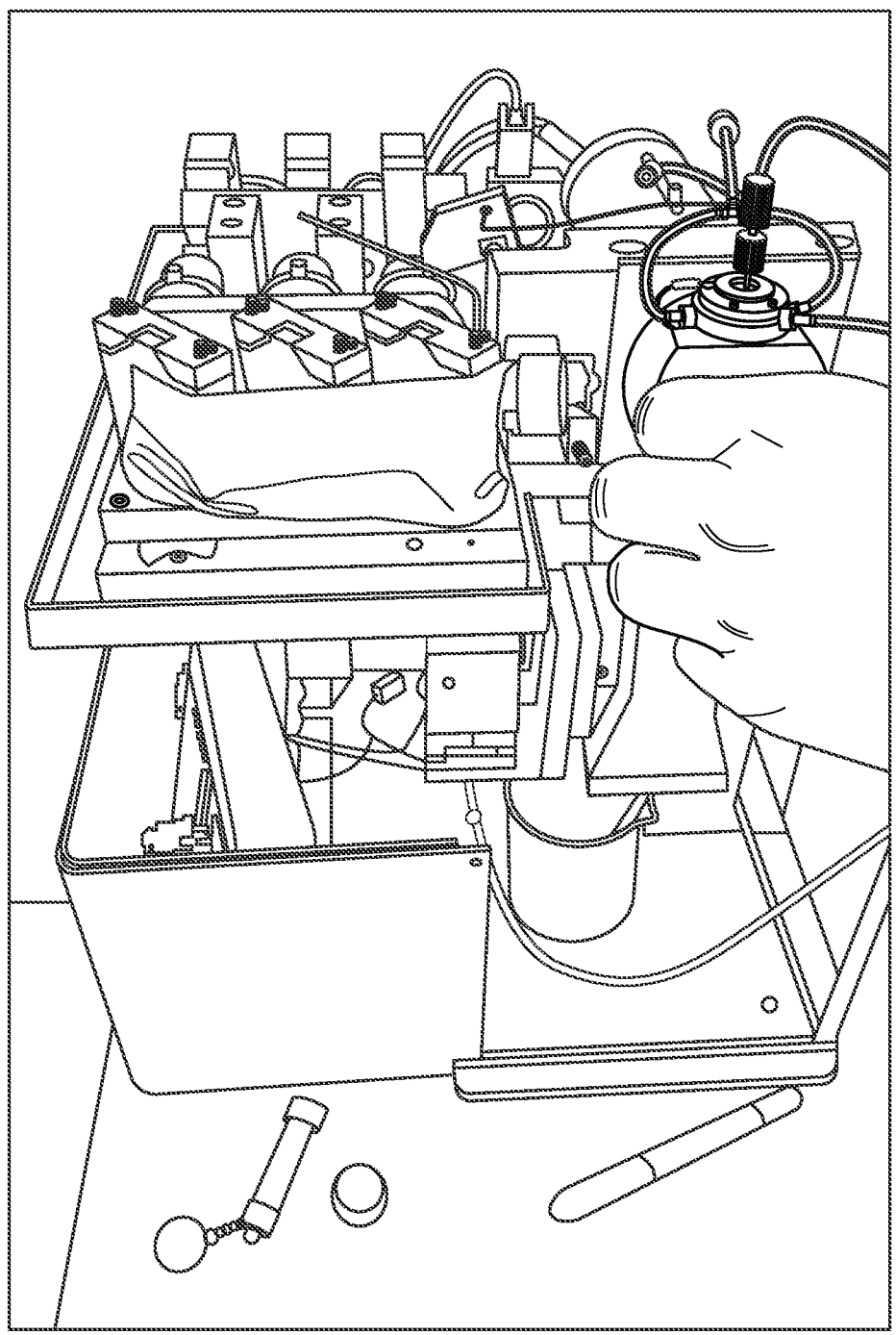

FIG. 13 depicts a particle sorting system coupled to a particle sorting module according to certain embodiments. System 1300 includes particle sorting module 1301 coupled to a wall of the particle sorting system and in fluid communication with a sample input module 1302 configured to convey a fluidic sample to the proximal end of particle sorting module 1301 and a waste tank 1303 configured to receive waste fluid from the distal end of particle sorting module 1301. Particle sorting module 1301 also includes two containers, 1301a and 1301b for collecting sorted particle components of the fluidic sample from sample input module 1302.

Figure 14:
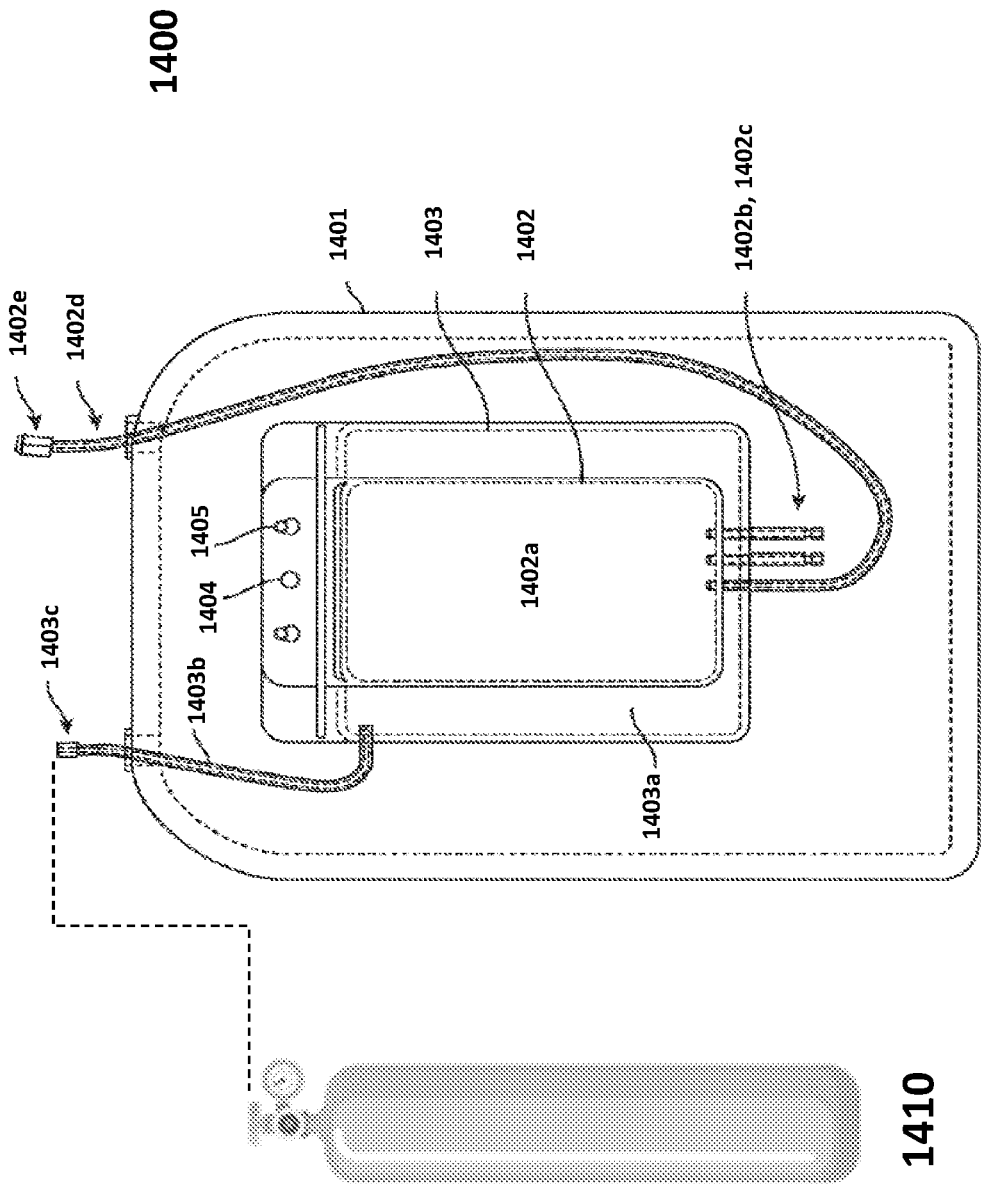
FIG. 14 depicts a sheath fluid delivery subsystem that includes a pliant fluid dispensing container structure with a first pliant container and a second pliant container according to certain embodiments.

FIG. 14 depicts a system for providing a fluid having a pliant fluid dispensing container structure according to certain embodiments. System 1400 includes a housing 1401 and a pliant fluid dispensing container structure positioned therein. The pliant fluid dispensing container structure includes a first pliant container 1402 and a second pliant container 1403. First pliant container 1402 includes two inlet conduits 1402b and 1402c for inputting a fluid (e.g., sheath fluid) into fluid reservoir 1402a. To convey fluid from fluid reservoir 1402a, first pliant container 1402 includes outlet conduit 1402d that is in fluid communication with fluid reservoir 1402a. Outlet conduit 1402d may include a fitting 1402e at the distal end, such as to mate with a sterile connector or directly to an inlet to a sample flow system of a flow cytometer. First pliant container 1402 is wholly positioned within second pliant container 1403. To facilitate input of a gas into gas reservoir 1403a of second pliant container 1403, an inlet conduit 1403b is in fluid communication with gas reservoir 1403a. Inlet conduit 1403b may also include a fitting 1403c at the distal end, such as to mate with a connector or directly to a gas source 1410. Each of first pliant container 1402 and second pliant container 1403 include a hole 1404 for hanging on a hook 1405 on an interior wall of housing 1401.

In certain embodiments, particle sorting systems of interest include a sheath fluid delivery subsystem for conveying sheath fluid to the particle sorting module, such as those described in co-pending PCT Patent Application No. PCT/US2016/048433 filed on Oct. 24, 2016 and published as WO 2017/040151; and U.S. patent application Ser. No. 14/365,602 now issued as U.S. Pat. No. 9,551,643, the disclosures of which are herein incorporated by reference in their entireties.

As mentioned above, any of the fluidic connections with respect to the sorting module, e.g., within the sorting module and/or between the sorting module and other aspects of the systems, e.g., receiving containers (such as bags), input tubes, etc., may be made using sterile tube welding, as desired. Any convenient sterile tube welding system and materials may be employed.

As summarized above, the subject systems are configured for sorting particle components of a sample, such as a biological sample. In some embodiments, systems further include a light detection system configured to irradiate and identify particle components of a sample in a flow stream. In these embodiments, systems include one or more light sources for irradiating a sample in a flow stream. The light source may be a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The subject systems may include one or more light sources, as desired, such as two or more light sources, such as three or more light sources, such as four or more light sources, such as five or more light sources and including ten or more light sources. The light source may include any combination of types of light sources. For example, in some embodiments, the subject systems include an array of lasers, such as an array having one or more gas lasers, one or more dye lasers and one or more solid-state lasers. In other instances, where two lights sources are employed, a first light source may be a broadband white light source (e.g., broadband white light LED) and second light source may be a broadband near-infrared light source (e.g., broadband near-IR LED). In other instances, where two light sources are employed, a first light source may be a broadband white light source (e.g., broadband white light LED) and the second light source may be a narrow spectra light source (e.g., near-IR LED or laser). In yet other instances, the light source is a plurality of narrow band light sources each emitting specific wavelengths, such as two or more lasers, such as three or more lasers including 5 or more lasers. In still other instances, the light source is an array of two or more LEDs, such as an array of three or more LEDs, such as an array of five or more LEDs, including an array of ten or more LEDs.

In some embodiments, light sources emit light having wavelengths ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a plurality of narrow band light sources emitting wavelengths ranging from 200 nm to 900 nm. For example, the light source may be plurality of narrow band LEDs (1 nm-25 nm) each independently emitting light having a range of wavelengths between 200 nm to 900 nm. In some embodiments, the narrow band light source is one or more narrow band lamps emitting light in the range of 200 nm to 900 nm, such as a narrow band cadmium lamp, cesium lamp, helium lamp, mercury lamp, mercury-cadmium lamp, potassium lamp, sodium lamp, neon lamp, zinc lamp or any combination thereof. In other embodiments, the narrow band light source includes one or more lasers emitting light in the range of 200 nm to 1000 nm, such as gas lasers, excimer lasers, dye lasers, metal vapor lasers and solid-state laser as described above.

The light source may be positioned at an angle with respect to the flow stream which ranges from 10° to 90°, such as from 15° to 85°, such as from 20° to 80°, such as from 25° to 75° and including from 30° to 60°. In certain embodiments, the light source is positioned at a 90° angle with respect to the sample.

In these embodiments, systems of interest also include one or more detectors for detecting and measuring light from the flow stream. Detectors of interest may include, but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the transmitted light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera. Where the fluorescent or scattered light is measured with a CCD, the active detecting surface area of the CCD may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$. The number of photodetectors in the subject systems may vary, as desired, such as 1 or more, such as 2 or more, such as 3 or more, such as 5 or more and including 10 or more photodetectors. Where the subject systems include more than one photodetector, each photodetector may be the same, or the collection of two or more photodetectors may be a combination of different photodetectors.

The detector may be positioned at a distance from the flow stream depending on the type of irradiating light source and characteristics of the sample (e.g., particle sizes in the sample). For example, the detector may be positioned 0.01 mm or more from the sample, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the sample. The detector may also be positioned at an angle with respect to the sample which varies. For example, the detector may be positioned at an angle with respect to the flow stream which ranges from 10° to 90°, such as from 15° to 85°, such as from 20° to 80°, such as from 25° to 75° and including from 30° to 60°. In certain embodiments, the detector is positioned at a 90° angle with respect to the flow stream. In some embodiments, systems include a detector that is positioned to detect forward scattered light from the flow stream. In other embodiments, systems include a detector that is positioned to detect side scattered light from the flow stream. In yet other embodiments, systems include a detector that is positioned to detect fluorescence from the flow stream.

Methods for Sorting Particle Components of a Sample in a Flow Stream

Aspects of the disclosure also include methods for sorting particles of a sample, such as cells in a biological sample. Methods according to certain embodiments include irradiating a sample containing particles in a flow stream in an interrogation region of a particle sorting module, detecting light (e.g., fluorescent light) from the sample, and sorting the particles of the sample into two or more sample collection containers. In certain embodiments, the sample is a biological sample and methods include sorting and collecting two or more different types of cells.

In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for separation from the flow stream according to a variety of parameters, such as a phenotypic characteristic identified via the attachment of a particular fluorescent label to cells of interest. In some embodiments, the system is configured to deflect analyzed droplets that are determined to include a target cell. A variety of cells may be targeted for sorting using the subject methods. Target cells of interest include, but are not limited to, stem cells, T cells, dendritic cells, B Cells, granulocytes, leukemia cells, lymphoma cells, virus cells (e.g., HIV cells) NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/ delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoetic progenitor cells (CD34+) from whole blood, bone marrow or cord blood.

In practicing the subject methods, a particle sorting module is coupled to a particle sorting system. To couple the particle sorting module to the particle sorting system, aligners on the outer wall of the particle sorting module housing are placed into contact with aligners on the register of the particle sorting system. When present, one or more fasteners may be engaged when the aligners on the outer wall of the particle sorting module housing are contacted with the aligners of the particle sorting system register to affix the particle sorting module to the particle sorting system. Depending on the sample being analyzed, the particle sorting module may be maintained in contact with the particle sorting system for any desired duration, such as for 1 minute or longer, such as 2 minutes or longer, such as 5 minutes or longer, such as 10 minutes or longer, such as 30 minutes or longer, such as 60 minutes or longer, such as 120 minutes or longer, such as 240 minutes or longer and including 480 minutes or longer.

After coupling the particle sorting module to the particle sorting system, an amount of a fluidic sample is injected into the particle sorting module. The amount of sample injected into the particle sorting module may vary, for example, ranging from 0.001 mL to 1000 mL, such as from 0.005 mL to 900 mL, such as from 0.01 mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and sorting labeled particles (e.g., target cells) in a sample. In practicing the subject methods, the fluidic sample including the particles is first introduced into the particle sorting module flow nozzle. Upon exit from the flow nozzle, the particles are passed substantially one at a time through the sample interrogation where each of the particles is irradiated to a source of light and measurements of light scatter parameters and fluorescent emissions as desired (e.g., two or more light scatter parameters and measurements of one or more fluorescent emissions) are separately recorded for each particle. The particles are passed in the flow stream substantially one at a time in a flow path through the sample interrogation region in the particle sorting module where each particle is illuminated by a light source. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In certain embodiments, methods including irradiating the flow stream at or near the flow cell nozzle orifice. For example, methods may include irradiating the flow stream at a position about 0.001 mm or more from the nozzle orifice, such as 0.005 mm or more, such as 0.01 mm or more, such as 0.05 mm or more, such as 0.1 mm or more, such as 0.5 mm or more and including 1 mm or more from the nozzle orifice. In certain embodiments, methods include irradiating the flow stream immediately adjacent to the flow cell nozzle orifice.

In series with a sensing region, detectors, such as photomultiplier tubes (or "PMT"), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (or FSC), orthogonal light scatter (SSC), and fluorescence emissions (FL1, FL2, etc.) include a separate parameter for each particle (or each "event"). Thus, for example, two, three or four parameters can be collected (and recorded) from a particle labeled with two different fluorescence markers.

As described above, suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD). Where the light from the irradiated flow stream at the sample interrogation region of the particle sorting module is measured with a CCD, the active detecting surface area of the CCD may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

The data recorded for each particle is analyzed in real time or stored in a data storage and analysis means, such as a computer, as desired. U.S. Pat. No. 4,284,412 describes the configuration and use of a flow cytometer of interest equipped with a single light source while U.S. Pat. No. 4,727,020 describes the configuration and use of a flow cytometer equipped with two light sources.

In embodiments of the present disclosure according to certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

Methods in certain embodiment also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In certain embodiments, the system operates to determine a timeslot during which one or more containers at the distal end of the particle sorting module are aligned with the deflected droplet receiving location. In some instances, the deflection signal includes an initial deflection sub-signal and a final deflection sub-signal; and the system operates to produce the deflection signal by sending an initial deflection sub-signal at the beginning of the timeslot that configures the deflector to deflect an analyzed droplet, when present. In certain cases, methods include sending a final deflection sub-signal to the particle sorting module at the end of the timeslot that configures the deflector not to deflect an analyzed droplet. In some embodiments, methods include sending a final deflection sub-signal to the particle sorting module after a single analyzed droplet has been deflected during the timeslot, where the final deflection sub-signal configures the deflector not to deflect an analyzed droplet.

In some embodiments, methods include detaching the particle sorting module from the particle sorting system by disengaging the aligners (and where present, fasteners) to detach the particle sorting module from the particle sorting system. In some instances, methods further include reattaching a second particle sorting module to the particle sorting system after the first particle sorting module has been removed. The first particle sorting module may be washed and sterilized for subsequent use (e.g., with an autoclave) or may be discarded. As such, in some embodiments, particle sorting modules as described herein are disposable, such as after a single use.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a sample in a flow stream in the sample interrogation region of a particle sorting module; algorithm for detecting light from the sample and measuring the detected light at one or more wavelengths and algorithm for sorting particles in the sample into two or more sample collection containers.

In embodiments, the system includes an input module, a processing module and an output module. In some embodiments, the subject systems may include an input module such that parameters or information about each fluidic sample, intensity and wavelengths (discrete or ranges) of the applied light source, properties of the particle sorting module including flow cell nozzle chamber size, nozzle orifice size, dimensions of sample interrogation region of the particle sorting module, the applied voltage of the deflection plates, position of containers at the distal end of the particle sorting module, duration of irradiation by the light source, number of different light sources, distance from light source to the flow stream in the sample interrogation region of the particle sorting module, focal length of any optical adjustment components, refractive index of flow stream medium (e.g., sheath fluid), presence of any wavelength separators, properties of wavelength separators including bandpass width, opacity, grating spacting as well as properties and sensitivity of photodetectors.

The processing module includes memory having a plurality of instructions for performing the steps of the subject methods, such as irradiating a sample in a flow stream in the sample interrogation region of a particle sorting module; detecting light from the sample in the flow stream, measuring the detected light at one or more wavelengths and sorting particles in the sample into two or more sample collection containers positioned at the distal end of the particle sorting module.

After the processing module has performed one or more of the steps of the subject methods, an output module communicates the results to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods, such as irradiating a sample in a flow stream in the sample interrogation region of a particle sorting module; detecting light from the sample in the flow stream, measuring the detected light at one or more wavelengths and sorting particles in the sample into two or more sample collection containers positioned at the distal end of the particle sorting module.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction therewith, in managing the treatment of a health condition, such as HIV, AIDS or anemia.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Kits

Aspects of the invention further include kits, where kits include one or more particle sorting modules, e.g., as described herein. In some embodiments, the kits also include one or more sample input modules and one or more waste tanks. Kits can also include one or more conduits for fluidically coupling the sample input module and waste tank to the particle sorting module. In some instances, kits also include connectors for coupling components of the subject systems together, such as connectors for coupling the sample input module to the particle sorting module, connectors for coupling the waste tank to the particle sorting module as well as connectors for coupling a sheath fluid delivery subsystem to the particle sorting module. Kits may include connectors such as Luer-lok connectors, screw-fit connectors as well as connector which join two components with a breakable seal. In certain instances, kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., particle sorting module, sample input module and waste tank, are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject particle sorting modules, particle sorting systems, methods and computer systems find use in a variety of applications where it is desirable to analyze and sort particle components in a sample in a fluid medium, such as a biological sample. Embodiments of the invention also find use in providing increased sterility to particle sorting systems which enhances collection of samples of greater purity as well as reduces incidences of cross-contamination between analyzed samples, such as in research and high throughput laboratory testing. Embodiments of the invention also find use where it is desirable to provide a flow cytometer with improved cell sorting accuracy, enhanced particle collection, particle charging efficiency, more accurate particle charging and enhanced particle deflection during cell sorting.

Embodiments of the invention also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Embodiments of the invention provide for closed sorting devices and methods, which may reduce, if not eliminate, one or more of: risk of contamination of the sample be processed; risk of exposure of operators to sample components, which may be important in situations where biohazardous samples are being processed; etc.

Notwithstanding the appended clauses, the disclosure set forth herein is also defined by the following clauses:

1. A particle sorting module comprising:

an enclosed housing comprising a proximal end and a distal end and a wall therebetween, the wall comprising an aligner for aligning the housing with a particle sorting system;

a flow cell nozzle positioned at the proximal end of housing, the flow cell nozzle comprising an orifice;

a sample interrogation region in fluid communication with the flow cell nozzle orifice; and a droplet deflector.

2. The particle sorting module according to clause 1, wherein the aligner comprises protrusions.

3. The particle sorting module according to clause 2, wherein the protrusions comprise ball tipped pins.

4. The particle sorting module according to any one of clauses 1-3, further comprising two or more sample collection containers.

5. The particle sorting module according to clause 4, wherein the sample collection containers are fastened to the distal end of the housing.

6. The particle sorting module according to clause 5, wherein the sample collection containers are screw threaded with the housing.

7. The particle sorting module according to any one of clauses 1-6, further comprising a cuvette positioned in the sample interrogation region.

8. The particle sorting module according to clause 7, wherein the cuvette is co-molded with the housing.

9. The particle sorting module according to clause 7, wherein the cuvette comprises glass.

10. The particle sorting module according to clause 7, wherein the cuvette comprises plastic.

11. The particle sorting module according to any one of clauses 1-10, further comprising a sample inlet at the proximal end of the housing.

12. The particle sorting module according to any one of clauses 1-10, further comprising a sheath fluid inlet at the proximal end of the housing.

13. The particle sorting module according to any one of clauses 1-12, further comprising one or more electrical connectors on the housing.

14. The particle sorting module according to any one of clauses 1-13, further comprising a sample agitator.

15. The particular sorting module according to any one of clauses 1-14, wherein the module is sterile.

16. A system comprising:
a particle sorting module comprising:
an enclosed housing comprising a proximal end and a distal end and a wall therebetween, the wall comprising an aligner for aligning the housing with a particle sorting system;
a flow cell nozzle positioned at the proximal end of housing, the flow cell nozzle comprising an orifice;
a sample interrogation region in fluid communication with the flow cell nozzle orifice; and
a droplet deflector;
a sample input module fluidically coupled to an inlet at the proximal end of the particle sorting module housing; and
a waste tank fluidically coupled to an outlet from the particle sorting module.

17. The system according to clause 16, further comprising a register for coupling with the aligner on the housing of the particle sorting module.

18. The system according to clause 17, wherein the housing of the particle sorting module comprises three aligners.

19. The system according to clause 18, wherein the register comprises a registration flat, a registration cone and a registration vee configured for coupling with the aligners.

20. The system according to any one of clauses 16-19, wherein the sample input module is fluidically coupled to inlet of the particle sorting module through a conduit.

21. The system according to clause 20, wherein conduit is coupled to the inlet with a sterile connector.

22. The system according to clause 21, wherein the connector is a Luer-Lok connector.

23. The system according to clause 21, wherein the connector is a screw-fit connector.

24. The system according to clause 21, wherein the connector comprises a breakable seal.

25. The system according to any one of clauses 16-24, wherein the sample input module is coupled to a gas input.

26. The system according to clause 25, wherein the gas input comprises a filter.

27. The system according to clause 26, wherein the gas input comprises two pinch valves.

28. The system according to any one of clauses 16-27, wherein the sample input module comprises an agitator.

29. The system according to clause 28, wherein the agitator is a ball agitator.

30. The system according to any one of clauses 16-29, wherein the sample input module comprises a temperature controller.

31. The system according to any one of clauses 16-30, wherein the waste tank comprises three or more ports.

32. The system according to clause 31, wherein the waste tank is fluidically coupled to the flow cell nozzle.

33. The system according to clause 31, wherein the waste tank is fluidically coupled to the distal end of the particle sorting module.

34. The system according to clause 31, wherein the waste tank comprises a gas venting port.

35. The system according to any one of clauses 16-34, wherein the aligner comprises protrusions.

36. The system according to clause 35, wherein the protrusions comprise ball tipped pins.

37. The system according to any one of clauses 16-36, further comprising two or more sample collection containers.

38. The system according to clause 37, wherein the sample collection containers are fastened to the distal end of the housing.

39. The system according to clause 38, wherein the sample collection containers are screw threaded with the housing.

40. The system according to any one of clauses 16-39, further comprising a cuvette positioned in the sample interrogation region.

41. The system according to clause 40, wherein the cuvette is co-molded with the housing.

42. The system according to any one of clauses 16-41, further comprising a sheath fluid delivery subsystem.

43. The system according to clause 42, wherein the sheath fluid delivery subsystem comprises a sterile pliant container.

44. The system according to clause 43, wherein the sheath fluid delivery subsystem comprises a pressured tank.

45. The system according to clause 43, wherein the sheath fluid delivery subsystem comprises:
a housing;
a first pliant container and a second pliant container positioned within the housing, wherein:
the first pliant container comprises:
a fluid reservoir; and
a conduit comprising a proximal end and a distal end, wherein the proximal end is fluidically coupled to the fluid reservoir and the distal end is configured for coupling the conduit to the particle sorting module; and the second pliant container comprises:
a gas reservoir; and
a port in gaseous communication with the gas reservoir, wherein the second pliant container is positioned in the housing with the first pliant container and is configured to apply pressure to the fluid reservoir of the first pliant container sufficient to convey fluid from the distal end of the conduit into the particle sorting module.

46. The system according to any one of clauses 16-45, wherein the system is sterile.
47. A method comprising:
irradiating with a light source a sample comprising particles in a flow stream in an interrogation region of a particle sorting module, the particle sorting module comprising:
an enclosed housing comprising a proximal end and a distal end and a wall therebetween, the wall comprising an aligner for aligning the housing with a particle sorting system;
a flow cell nozzle positioned at the proximal end of housing, the flow cell nozzle comprising an orifice;
a sample interrogation region in fluid communication with the flow cell nozzle orifice; and
a droplet deflector;
detecting light from the sample;
and
sorting the particles in the sample into two or more sample collection containers.
48. The method according to clause 47, wherein the particles are cells.
49. The method according to any one of clauses 47-48, wherein the aligner comprises protrusions.
50. The method according to clause 49, wherein the protrusions comprise ball tipped pins.
51. The method according to any one of clauses 47-50, wherein the sample collection containers are fastened to the distal end of the housing.
52. The method according to clause 51, wherein the sample collection containers are screw threaded with the housing.
53. The method according to any one of clauses 47-52, further comprising a cuvette positioned in the sample interrogation region.
54. The method according to clause 53, wherein the cuvette is co-molded with the housing.
55. The method according to clause 53, wherein the cuvette comprises glass.
56. The method according to clause 53, wherein the cuvette comprises plastic.
57. The method according to any one of clauses 47-56, further comprising a sheath fluid inlet at the proximal end of the housing.
58. The method according to any one of clauses 47-57, further comprising one or more electrical connectors on the housing.
59. The method according to any one of clauses 47-58, wherein the method is performed under sterile conditions.
60. A kit comprising:
a particle sorting cartridge according to any one of clauses 1-14;
a sample input module; and
a waste tank.
61. The kit according to clause 60, wherein each of the particle sorting cartridge, the sample input module and waste tank are present in a container.
62. The kit according to clause 61, wherein the container is a pouch.
63. The kit according to any one of clauses 60 to 62, further comprising one or more conduits for fluidically coupling the particle sorting cartridge to one or more of the sample input module and the waste tank.
64. The kit according to clause 63, further comprising a sterile connector.
65. The kit according to clause 64, wherein the connector is a Luer-Lok connector.
65. The kit according to clause 64, wherein the connector is a screw-fit connector.
66. The kit according to clause 64, wherein the connector comprises a breakable seal.
67. The kit according to any one of clauses 60 to 66, wherein the kit components are sterile.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A particle sorting module comprising:
a housing comprising a proximal end and a distal end and a wall therebetween, the wall comprising an aligner configured to align the housing with a particle sorting system;
a flow cell nozzle comprising a distal end and positioned at the proximal end of the housing, the flow cell nozzle comprising an orifice positioned at the distal end of the flow cell nozzle;
a cuvette fluidically coupled to the flow cell nozzle orifice; and
a droplet deflector positioned in the housing, distal to the cuvette,
wherein the flow cell nozzle, the cuvette, and the droplet deflector are fully contained in the housing.

2. The particle sorting module according to claim 1, wherein the aligner comprises protrusions.

3. The particle sorting module according to claim 2, wherein the protrusions comprise ball tipped pins.

4. The particle sorting module according to claim 1, further comprising two or more sample collection containers positioned at the distal end of the housing.

5. The particle sorting module according to claim 4, wherein the two or more sample collection containers are fastened to the distal end of the housing.

6. The particle sorting module according to claim 5, wherein the two or more sample collection containers are screw threaded to the housing.

7. The particle sorting module according to claim 1, wherein the cuvette is co-molded with the housing.

8. The particle sorting module according to claim 1, wherein the cuvette comprises glass.

9. The particle sorting module according to claim 1, wherein the cuvette comprises plastic.

10. The particle sorting module according to claim 1, further comprising a first inlet at the proximal end of the housing.

11. The particle sorting module according to claim 10, further comprising a second inlet at the proximal end of the housing.

12. The particle sorting module according to claim 1, further comprising one or more electrical connectors on the housing.

13. The particle sorting module according to claim 1, wherein the particle sorting module is sterile.

14. A system comprising:
    a particle sorting module comprising:
        a housing comprising a proximal end and a distal end and a wall therebetween, the wall comprising an aligner configured to align the housing with a particle sorting system;
        a first inlet at the proximal end of the particle sorting module housing;
        a flow cell nozzle comprising a distal end and positioned at the proximal end of the housing, the flow cell nozzle comprising an orifice positioned at the distal end of the flow cell nozzle;
        a cuvette fluidically coupled to the flow cell nozzle orifice; and
        a droplet deflector positioned in the housing, distal to the cuvette, wherein the flow cell nozzle, the cuvette, and the droplet deflector are fully contained in the housing;
    a sample input module fluidically coupled to the first inlet; and
    a waste tank fluidically coupled to an outlet from the particle sorting module.

15. The system according to claim 14, wherein the proximal end of the particle sorting module housing comprises a second inlet, and the system further comprises a sheath fluid delivery subsystem fluidically coupled to the second inlet.

16. The system according to claim 15, wherein the sheath fluid delivery subsystem comprises a sterile pliant container.

17. The system according to claim 15, wherein the sheath fluid delivery subsystem comprises:
    a housing;
    a first pliant container and a second pliant container positioned within the housing; and
    a source of gas, wherein:
    the first pliant container comprises:
        a first reservoir; and
        a first conduit comprising a proximal end and a distal end, wherein the proximal end of the first conduit is fluidically coupled to the first reservoir and the distal end of the first conduit is fluidically coupled to the particle sorting module; and
    the second pliant container comprises:
        a second reservoir; and
        a second conduit gaseously coupled to the second reservoir and the source of gas,
    wherein the second pliant container is positioned in the housing with the first pliant container and is configured to apply pressure to the first reservoir of the first pliant container sufficient to convey fluid from the distal end of the first conduit into the particle sorting module.

18. The system according to claim 14, wherein the system further comprises a sample agitator coupled to the sample input module.

* * * * *